(12) United States Patent
Coenegracht

(10) Patent No.: US 11,226,460 B2
(45) Date of Patent: Jan. 18, 2022

(54) MODULAR TELECOMMUNICATIONS ENCLOSURES

(71) Applicant: COMMSCOPE CONNECTIVITY BELGIUM BVBA, Kessel-Lo (BE)

(72) Inventor: Philippe Coenegracht, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 187 days.

(21) Appl. No.: 16/486,401

(22) PCT Filed: Feb. 15, 2018

(86) PCT No.: PCT/EP2018/053777
§ 371 (c)(1),
(2) Date: Aug. 15, 2019

(87) PCT Pub. No.: WO2018/149917
PCT Pub. Date: Aug. 23, 2018

(65) Prior Publication Data
US 2021/0141180 A1    May 13, 2021

Related U.S. Application Data

(60) Provisional application No. 62/522,471, filed on Jun. 20, 2017, provisional application No. 62/459,260, filed on Feb. 15, 2017.

(51) Int. Cl.
*G02B 6/44* (2006.01)
*B65D 21/02* (2006.01)
*G02B 6/38* (2006.01)

(52) U.S. Cl.
CPC ....... *G02B 6/4446* (2013.01); *B65D 21/0224* (2013.01); *G02B 6/3897* (2013.01); *G02B 6/4471* (2013.01)

(58) Field of Classification Search
None
See application file for complete search history.

(56) References Cited

U.S. PATENT DOCUMENTS 4,911,521 A * 3/1990 Ryuto ................ G02B 6/4447
  385/135
5,613,029 A * 3/1997 Burek ................ G02B 6/4452
  211/194

(Continued)

FOREIGN PATENT DOCUMENTS

FR    2 917 185 A1    12/2008
WO    2014/052963 A1    4/2014

(Continued)

OTHER PUBLICATIONS

International Search Report and Written Opinion of the International Searching Authority for International Patent Application No. PCT/EP2018/053777 dated May 29, 2018, 13 pages.

*Primary Examiner* — Michael Stahl
(74) *Attorney, Agent, or Firm* — Merchant & Gould P.C.

(57) ABSTRACT

Fiber optic modules for managing optical fibers and optical connections. In some examples, multiple modules are stackable. In some examples, the modules are configured to facilitate cable/fiber routing. Stacking elements can be used to serially stack multiple modules together. Components, such as lids and covers of the modules, can be substituted for components of different configurations. The modules and stacking elements are configured to reduce/minimize space taken up by stacking.

20 Claims, 35 Drawing Sheets

(56) References Cited

U.S. PATENT DOCUMENTS

| | | | |
|---|---|---|---|
| 5,975,769 A | 11/1999 | Larson et al. | |
| 6,192,180 B1* | 2/2001 | Kim | G02B 6/4455 385/135 |
| 8,861,919 B2 | 10/2014 | Alston et al. | |
| 9,395,507 B1 | 7/2016 | Gross et al. | |
| 9,632,269 B1* | 4/2017 | Galvan Mijangos | G02B 6/445 |
| 10,371,912 B2 | 8/2019 | Coenegracht et al. | |
| 2005/0072709 A1* | 4/2005 | Mann | B65D 21/0224 206/503 |
| 2009/0252472 A1* | 10/2009 | Solheid | G02B 6/4454 385/135 |
| 2010/0219193 A1* | 9/2010 | Becklin | B65D 21/0224 220/630 |
| 2015/0346450 A1 | 12/2015 | Barnes et al. | |
| 2015/0378122 A1 | 12/2015 | Simmons | |
| 2016/0091682 A1* | 3/2016 | Wakileh | G02B 6/4446 385/135 |
| 2016/0161694 A1 | 6/2016 | Nieves et al. | |
| 2018/0003912 A1* | 1/2018 | Sedor | G02B 6/4455 |
| 2019/0025533 A1* | 1/2019 | Larsson | G02B 6/4454 |
| 2019/0170961 A1 | 6/2019 | Coenegracht et al. | |

FOREIGN PATENT DOCUMENTS

| | | |
|---|---|---|
| WO | 2015/193384 A2 | 12/2015 |
| WO | 2017/046185 A2 | 3/2017 |
| WO | 2017/046190 A2 | 3/2017 |

\* cited by examiner

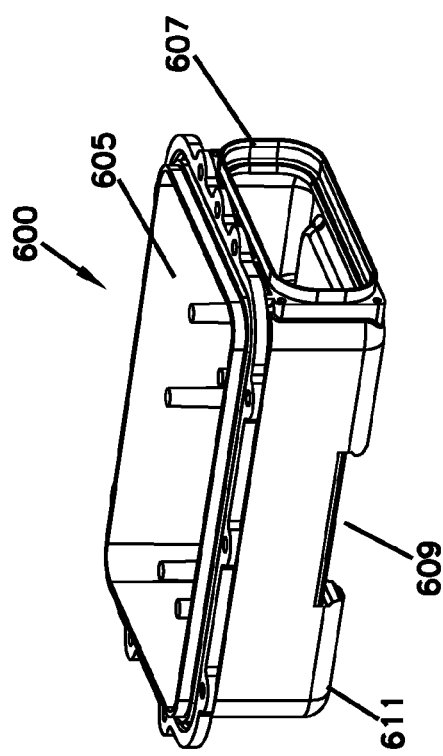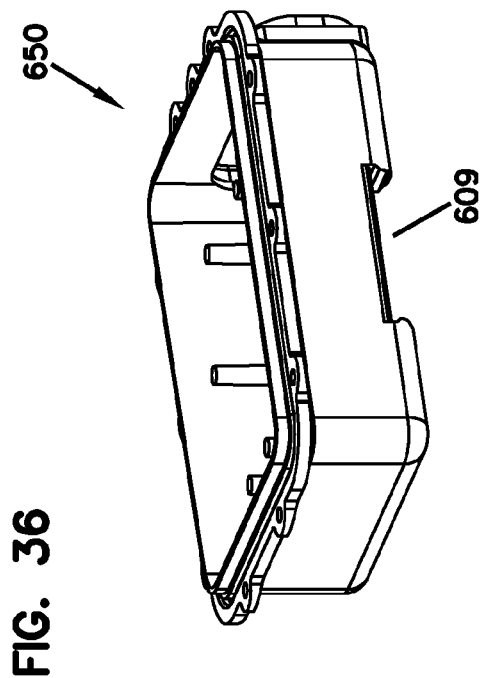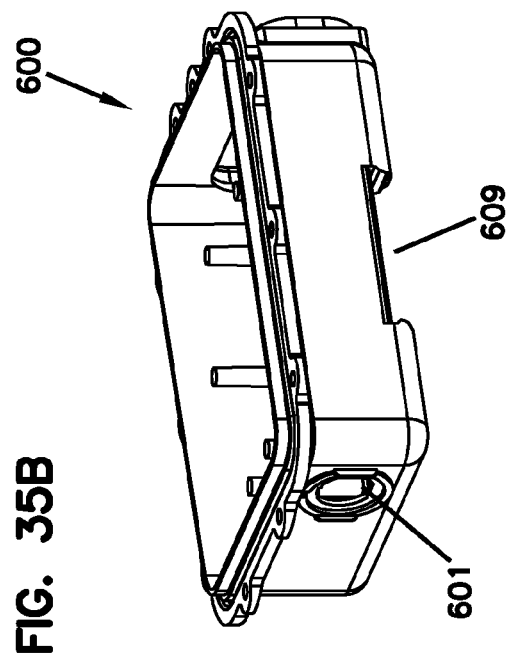

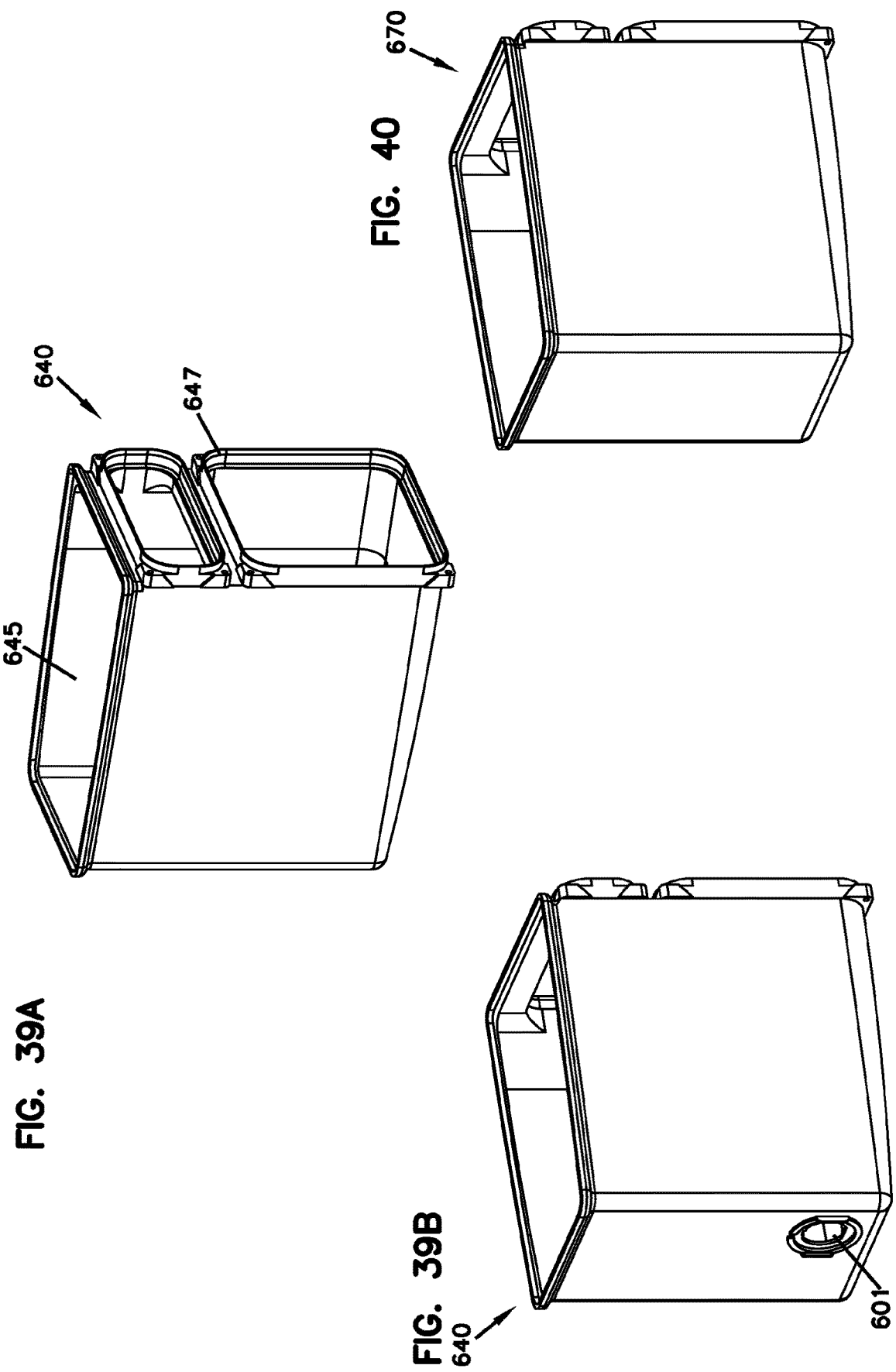

MODULAR TELECOMMUNICATIONS ENCLOSURES

CROSS-REFERENCE TO RELATED APPLICATIONS

This application is a National Stage Application of PCT/EP2018/053777, filed on Feb. 15, 2018, which claims the benefit of U.S. Patent Application Ser. No. 62/459,260, filed on Feb. 15, 2017, and claims the benefit of U.S. Patent Application Ser. No. 62/522,471, filed on Jun. 20, 2017, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to enclosures used in optical fiber communication systems. The disclosures of PCT Patent Application No. PCT/EP2016/071740 filed Sep. 14, 2016 are incorporated by reference in their entirety.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors and fiber optic enclosures are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, indexing components, connection fields/panels, connectorized pigtails, wavelength divisional multi-plexers and other components.

Many fiber optic enclosures are designed to be installed in outside environments and are environmentally sealed. This type of enclosure can also include sealed connector ports for interfacing with connectorized drop cables. Optical fibers of the fiber optic network cable routed into the enclosure are often accessed within the enclosure and spliced to another cable such as a drop cable, directly connectorized or spliced to connectorized pigtails. When the fibers are connectorized, the connectorized ends can be plugged into inner ends of fiber optic adapters incorporated into the sealed connector ports. In the field, outer ends of the fiber optic adapters can be used to receive ruggedized fiber optic connectors corresponding to drop cables to provide optical connections between the drop cables and optical fibers of the fiber optic network cable without having to access an interior of the enclosure.

SUMMARY

One aspect of the present disclosure relates to telecommunications systems having modular enclosures ("modules") that can be readily combinable with other modular enclosures and/or otherwise readily modifiable in the field.

The interior volume defined by each of the modular enclosures of the present disclosure can be used for any of a variety of telecommunications functions. For example, optical fibers can be split, spliced, fanned out, indexed, and/or stored in the enclosure modules. Enclosure modules are defined by an outer housing and the term housing module will be used interchangeably throughout this disclosure with the terms enclosure module. Optical cables can interface with the enclosure modules at connectors or other fiber terminals. In addition, optical cables can interface with the enclosure modules in a non-connectorized fashion, the fibers of the cable passing into or out of the enclosure without termination or connectorization. One or more fiber management elements can be provided within an interior volume of an enclosure module to help, e.g., splice, fan out, split, index, and/or store the optical fibers.

Within a given stack of a plurality of enclosure modules, the interior volumes of adjacent modules can be in open communication with each other or alternatively closed off from each other, each junction between adjacent modules being selectively closed off or open by selecting the appropriate configuration of stacking element to couple the adjacent pair of modules together. Modules that are internally open to (i.e., in communication with) one another can allow for optical pathways to be routed between and among different modules in a given stack, depending on the desired telecommunications application/use for the module stack in question.

Another aspect of the present disclosure relates to telecommunications systems having modular enclosures that can be joined to form stacks and other configurations of enclosure modules while minimizing the physical space occupied by the stacks of enclosure modules. Thus, the number and types of modules in a given enclosure system can be increased or decreased easily.

Thus, the features of the present disclosure provide for tremendous flexibility in forming, adapting, and modifying systems of telecommunications enclosures in the field to meet specific needs and parameters, and also to adapt to changing needs and/or parameters.

Another aspect of the present disclosure relates to a telecommunications enclosure system comprising: a plurality of enclosure modules selectable from a plurality of enclosure module configurations, each of the enclosure modules defining an interior volume and comprising a plurality of sides, at least one of the sides including an opening; a plurality of covers selectable from a plurality of cover configurations, each of the covers comprising a plate and being removably mountable to one of the plurality of enclosure modules to at least partially cover the opening; and a plurality of stacking elements selectable from a plurality of stacking element configurations, at least one of the stacking element configurations being adapted to couple a first of the enclosure modules to a second of the enclosure modules.

Another aspect of the present disclosure relates to a telecommunications enclosure system comprising: a plurality of enclosure modules selectable from a plurality of enclosure module configurations, each of the enclosure modules defining an interior volume; and a plurality of stacking elements selectable from a plurality of stacking element configurations, at least one of the stacking element configurations being adapted to couple a first of the enclosure modules to a second of the enclosure modules; wherein for any of a set of all assemblies having a) N of the enclosure modules in which every adjacent pair of the N enclosure modules are coupled by one of the stacking elements, N being a positive integer greater than one; and b) a total interior volume equal to a sum of the interior volumes of the N enclosure modules, a set of external dimensions of the assembly is substantially constant.

Another aspect of the present disclosure relates to a telecommunications enclosure system comprising: a plurality of enclosure modules selectable from a plurality of enclosure module configurations, each of the enclosure modules defining an interior volume and comprising a plurality of sides, at least one of the sides including an opening, the enclosure module configurations being selectable from at least: a first enclosure module configuration in which a first of the sides is an open stacking side and a second of the sides opposite the first of the sides is a closed stacking side; a second enclosure configuration in which a first of the sides is an open stacking side and a second of the sides opposite the first of the sides is an open stacking side; and a third enclosure configuration in which a first of the sides is a closed stacking side and a second of the sides opposite the first of the sides is a closed stacking side; a plurality of covers, each of the covers comprising a plate and being removably mountable to one of the plurality enclosure modules to at least partially cover the opening; and a plurality of stacking elements, at least one of the stacking elements being adapted to couple a first of the enclosure modules to a second of the enclosure modules.

In still a further aspect of the present disclosure, a telecommunications enclosure system comprises: a plurality of enclosure modules, each of the enclosure modules defining an interior volume and comprising a plurality of sides, at least one of the sides including an opening; and a plurality of stacking elements selectable from a plurality of stacking element configurations, the stacking element configurations being selected from at least: a first stacking element configuration comprising a first member adapted to enter the interior volume of a first of the enclosure modules and a second member adapted to close off an open stacking side of the sides of the first enclosure module and terminate a stack of at least the first enclosure module; a second stacking element configuration comprising a first member adapted to enter the interior volume of a first of the enclosure modules and a second member adapted to close off an open stacking side of the sides of the first enclosure module and couple to a second of the enclosure modules; a third stacking element configuration comprising a first member adapted to enter the interior volume of a first of the enclosure modules, a second member adapted to enter the interior volume of a second of the enclosure modules, and a third member disposed between the first member and the second member and adapted to close off an open stacking side of the sides of each of the first enclosure module and the second enclosure module and to couple the first housing module to the second housing module; and a fourth stacking element configuration comprising a first member adapted to enter the interior volume of a first of the enclosure modules, a second member adapted to enter the interior volume of a second of the enclosure modules, a third member disposed between the first member and the second member and adapted to couple the first enclosure module to the second enclosure module, and a channel, the channel passing through each of the first, second and third members to provide communication between the interior volume of the first enclosure module and the interior volume of the second enclosure module.

Another aspect of the present disclosure relates to a kit for assembling a system of fiber optic modules, the kit comprising: a plurality of enclosure modules; and/or at least one stacking element for stacking a pair of modules; and/or at least one cover for covering an opening in an enclosure module and/or providing a connectorizing interface between an exterior of an enclosure module and an interior volume of the enclosure module; and/or at least one lid for closing a top of an enclosure module and/or for providing an attachment interface for a stacking element; and/or a mounting bracket for terminating a stack of a plurality of enclosure modules and/or for mounting an enclosure module to a structure. In some examples, the kit can include one or more module couplers or coupling components adapted to couple a stacking element to an adjacent enclosure module or mounting bracket.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 35A is a front, top perspective view of an example housing module configuration in accordance with the present disclosure.

FIG. 35B is a rear, top perspective view of the housing module of FIG. 35A.

FIG. 36 is a rear, top perspective view of a further example housing module configuration in accordance with the present disclosure.

FIG. 39A is a front, top perspective view of a further example housing module configuration in accordance with the present disclosure.

FIG. 39B is a rear, top perspective view of the housing module of FIG. 39A.

FIG. 40 is a rear, top perspective view of a further example housing module configuration in accordance with the present disclosure.

DETAILED DESCRIPTION

Figure 1:
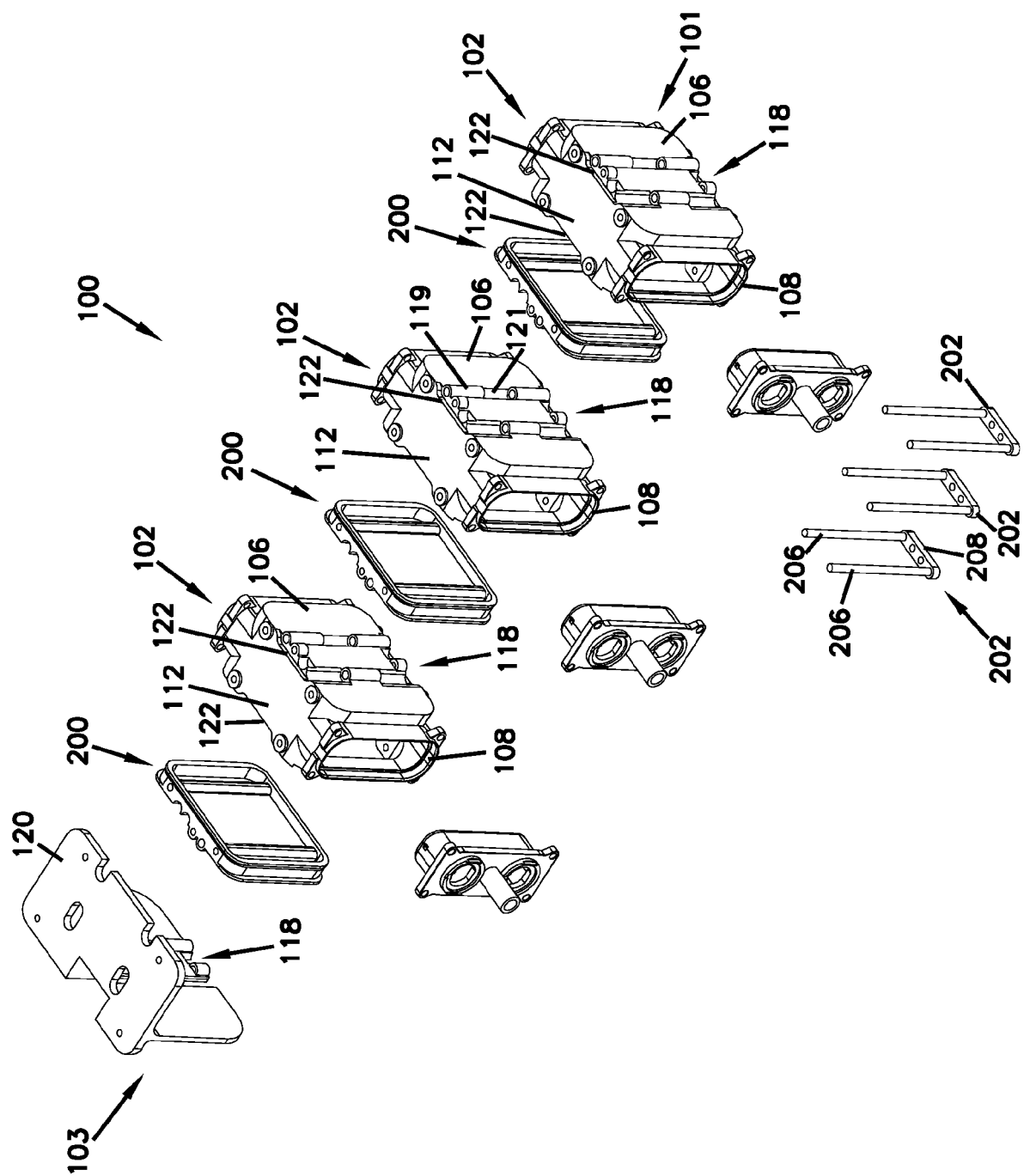
FIG. 1 is a bottom perspective exploded view of one example telecommunications system in accordance with the present disclosure.
Figure 2:
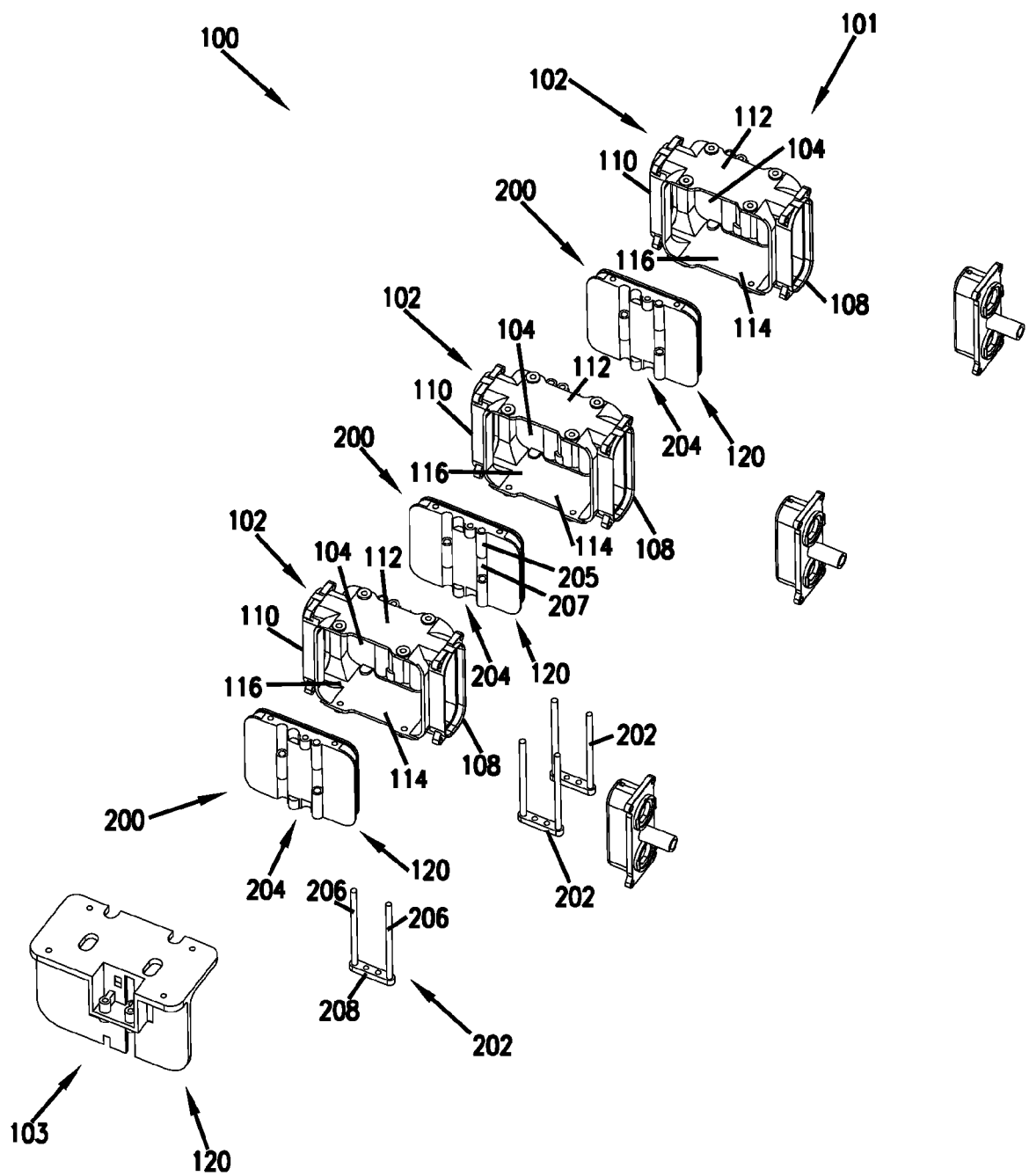
FIG. 2 is a top perspective exploded view of the telecommunications system of FIG. 1.

FIG. 1 is a top perspective exploded view of one example telecommunications system 100 in accordance with the present disclosure. FIG. 2 is a bottom perspective exploded view of the telecommunications system 100 of FIG. 1. The system 100 has a top 101 and a bottom 103. As used throughout this application, positional descriptors, such as top, bottom, front, back/rear, left, right, upper, lower, above, below, forward, rearward, height, horizontal, vertical, etc. are used for ease of reference and relative orientation of components and features in the drawings. These descriptors are not intended to limit how such components or features may be orientated in practice, e.g., in the field, unless specifically so recited in the claims.

Referring to FIGS. 1-2, the system 100 includes a plurality of enclosure modules 102, which can be joined to one another to form a stack of enclosure modules. In this example system 100, all of the enclosure modules 102 have the same configuration. In other systems, the system can include a plurality of configurations of enclosure modules.

Each of the enclosure modules 102 includes an open stacking side 104, a closed stacking side 106 opposite the open stacking side 104, a first opening 108 and a second opening 110 that is opposite the first opening. The first opening 108 can be considered an input opening to the enclosure module 102, while the second opening 110 can be considered an output opening. For example, optical signals from a network provider can travel along optical fibers that enter the enclosure module 102 via the first opening 108 and exit the enclosure module 102 via the second opening 110. Opposing side walls 112 and 114 join the open stacking side 104 to the closed stacking side 106, such that the enclosure module 102 is essentially a block-like housing defining an interior volume 116.

The stacking side 106 of each of the enclosure modules 102, as well as the base piece or mounting bracket 120 of the stack includes a portion 118 of a stacking mechanism. The system 100 includes a plurality of stacking elements 200. To make the stack of enclosure modules 102, a stacking element 200 is disposed between adjacent pairs of the enclosure modules 102. Another stacking element 200 is disposed at an end of the stack between an enclosure module 102 and the base piece 120 of the stack. The base piece or bracket 120 can be coupled to the stack of enclosure modules via a stacking element and used to secure the stack to another structure, such as a wall or a telecommunications rack or cabinet.

The stacking elements 200 are configured to pair with the enclosure modules 102. Thus, in the example system of FIGS. 1-2, all of the stacking elements 200 used in the system have the same configuration. In other example systems, stacking elements of differing configurations can be used in the same stack.

The system 100 also includes coupling components 202. Coupling components couple stacking elements to their adjacent enclosure modules or base piece. In the example system 100, each coupling component 202 couples a stacking mechanism portion 118 on an enclosure module 102 to a complementary stacking mechanism portion 204 of a stacking element 200. In the example shown, the coupling components 202 include a pair of parallel pins 206 extending from a base 208. The stacking mechanism portions 118 and 204 include complementary nesting grooves and knuckles, e.g., the knuckles 119 and grooves 121 of the stacking mechanism portion 118, and the knuckles 205 and grooves 207 of the stacking mechanism portion 204. Once the knuckles of a portion 118 are nested in the grooves of the portion 204 (and correspondingly the knuckles of the portion 204 are nested in the grooves of the portion 118, the pins 206 can be inserted through the knuckles (119, 205) to couple a stacking element 200 to either an enclosure module 102 or a base piece 120.

Figure 3A:
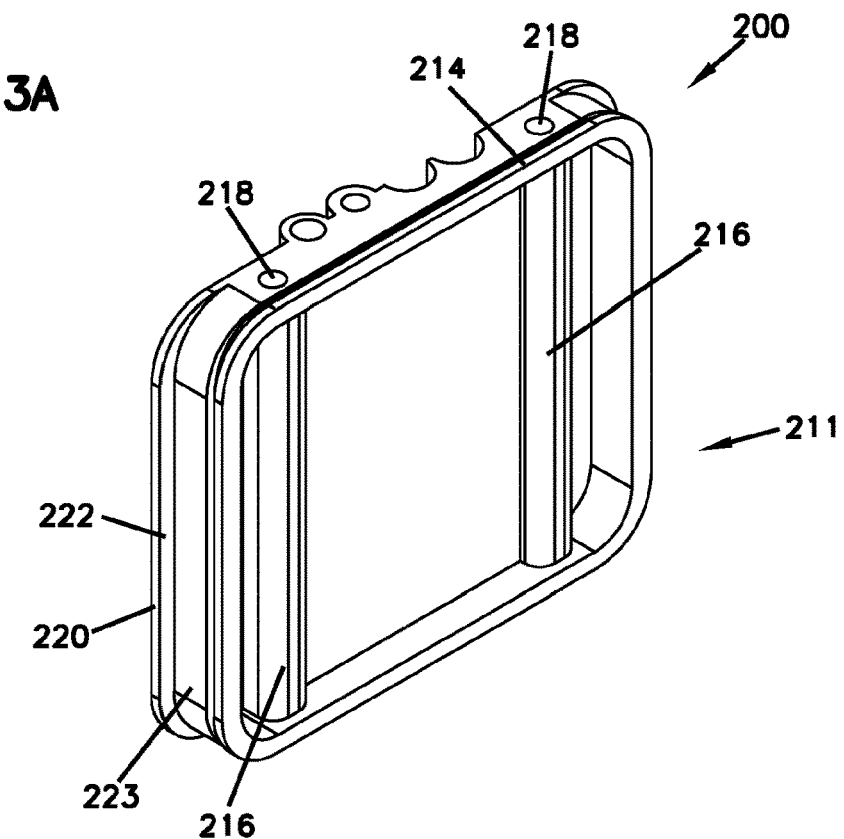
FIG. 3A is a top perspective view of the stacking element of FIG. 1.
Figure 3B:
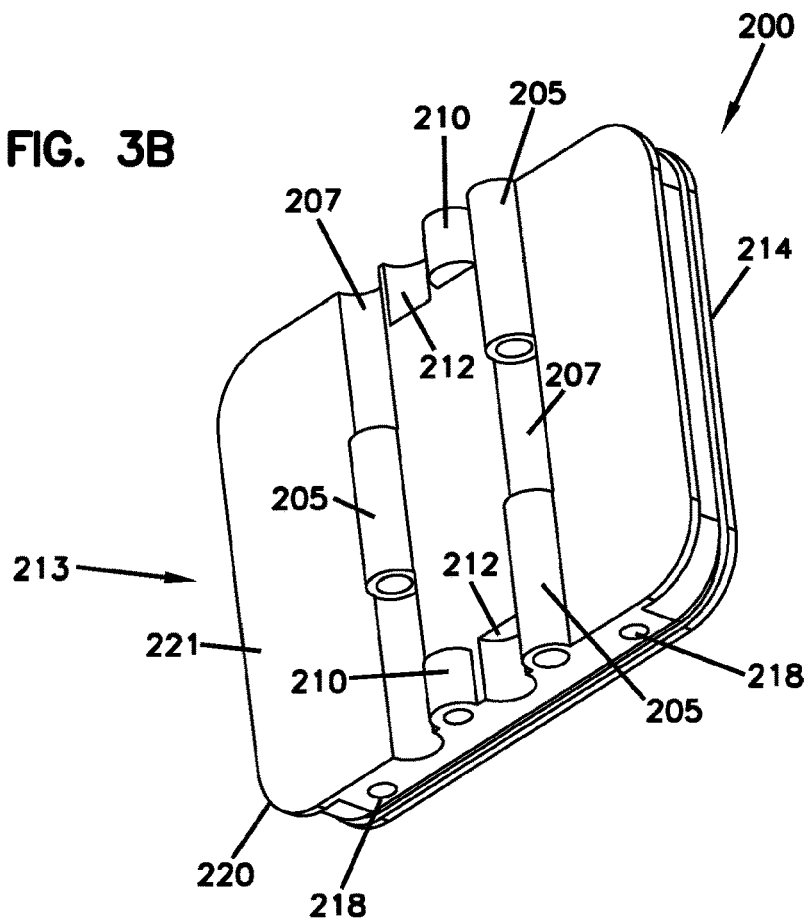
FIG. 3B is a bottom perspective view of the stacking element of FIG. 1.

FIG. 3A is a top perspective view of the stacking element 200 of FIG. 1. FIG. 3B is a bottom perspective view of the stacking element 200 of FIG. 1.

Referring to FIGS. 3A and 3B, the stacking element 200 has a top 211 a bottom 213, a first member 223 adapted to enter the interior volume of an enclosure module and a second member 221 adapted to close off an open stacking side of an enclosure module and further adapted to couple two adjacent enclosure modules together.

More specifically, the second member 221 of the stacking element 200 includes the knuckles 205 and the grooves 207 discussed above. The configuration of knuckles and grooves is configured to nest with a mirror image of the same knuckles and grooves, i.e., when two such configurations are face to face, as in the case of adjacent enclosure modules. Additional projections 210 and recesses 212 of the second member 221 provide for further nesting capability. The second member 221 at the bottom of the stacking element 200 also has a protruding lip 220 that protrudes far enough to remain exterior to an enclosure module when the stack of enclosure modules is assembled, the flange 222 of the protruding lip 220 abutting the bottom of the wall of the enclosure module 102 when assembled. When the flange 222 abuts the wall of an enclosure module, that open stacking side of the enclosure module is effectively closed off.

A flexible (e.g., elastomeric) rib 214 about the perimeter or a portion of the perimeter of the first member 223 of the stacking element 200 can abut an interior wall of an enclosure module 102 to provide a seal therebetween. Channels 216 can receive fasteners (e.g., screws, pins, etc.) via their openings 218. When the stack of enclosure modules is assembled, the openings 218 and channels 216 align with corresponding openings in the wall(s) of the enclosure module 102, enabling the enclosure module 102 and stacking element 200 to be coupled together.

Figure 4:
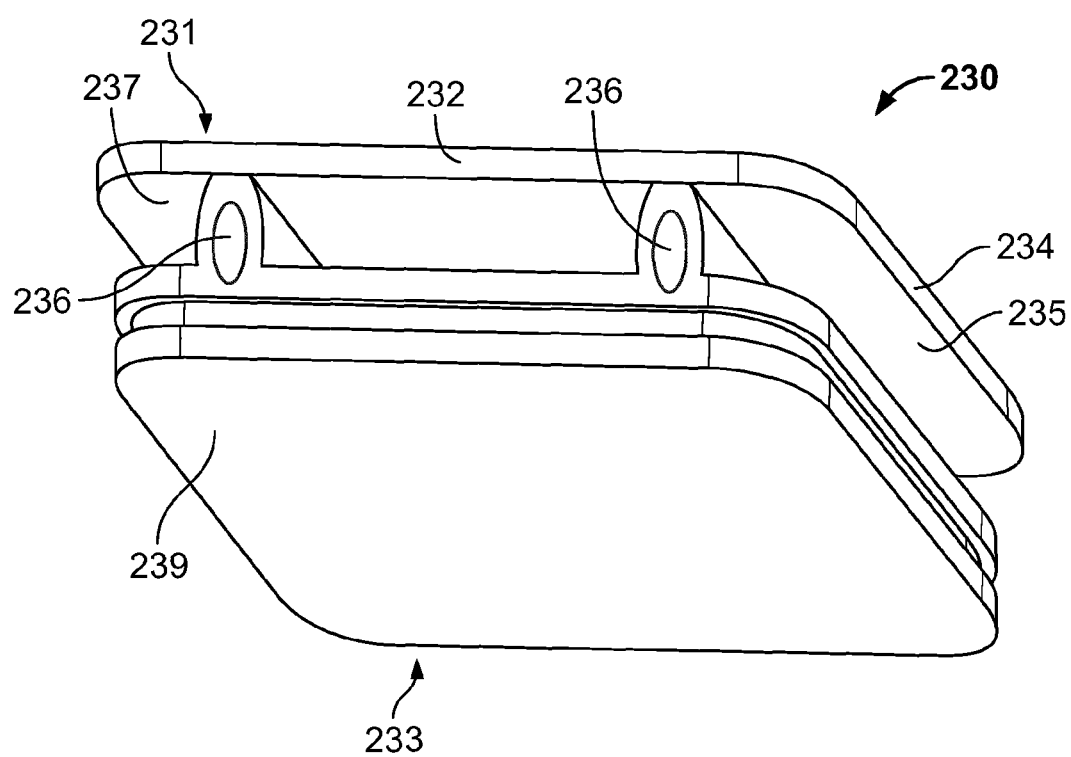
FIG. 4 is a bottom perspective view of a further embodiment of a stacking element in accordance with the present disclosure.

FIG. 4 is a bottom perspective view of a further embodiment of a stacking element 230 in accordance with the present disclosure. The stacking element 230 has a top 231 and a bottom 233. A first member 237 configured to close off an open stacking side of an enclosure module includes a plate 232 at the top 231 of the stacking element 230, the plate having a protruding portion 234 around at least a portion of its perimeter. The undersurface 235 of the protruding portion 234 is configured to rest on a wall of an enclosure module, analogous to the protruding lip 220 of the stacking element 200, to effectively close off an open stacking side of an enclosure module. The remainder of the stacking element 230 is a second member 239 configured to enter the interior volume of an enclosure module. One or more channels 236 of the second member 239 with openings can receive fasteners through corresponding holes in the wall(s) of an enclosure module to couple the stacking element 230 to an enclosure module.

Unlike the stacking element 200, the stacking element 230 does not include a knuckle and groove stacking mechanism portion; rather the top of plate 232 is flat or substantially flat, which can serve to cleanly terminate a stack of enclosure modules. For example, a bottom of a bottom enclosure module in a stack of enclosure modules can be fastened to an end piece or mounting bracket (e.g., the end piece/mounting bracket 120 of FIG. 1), while the uppermost enclosure module of the stack can be closed off at its upper end by the stacking element 230.

Figure 5A:
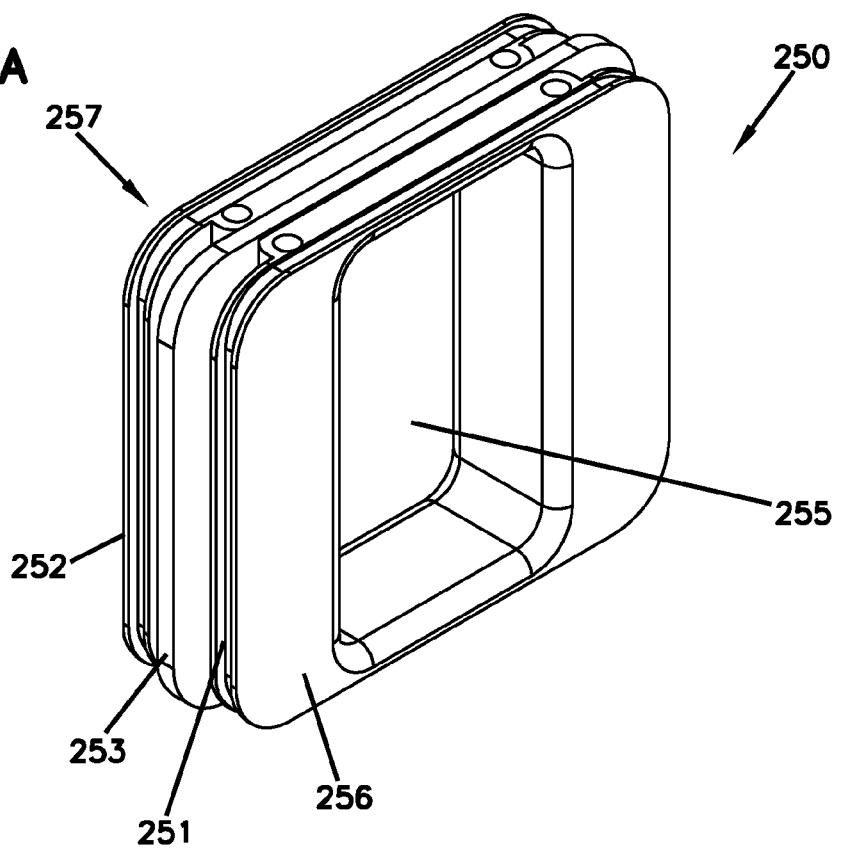
FIG. 5A is a perspective view of a further embodiment of a stacking element in accordance with the present disclosure.
Figure 5B:
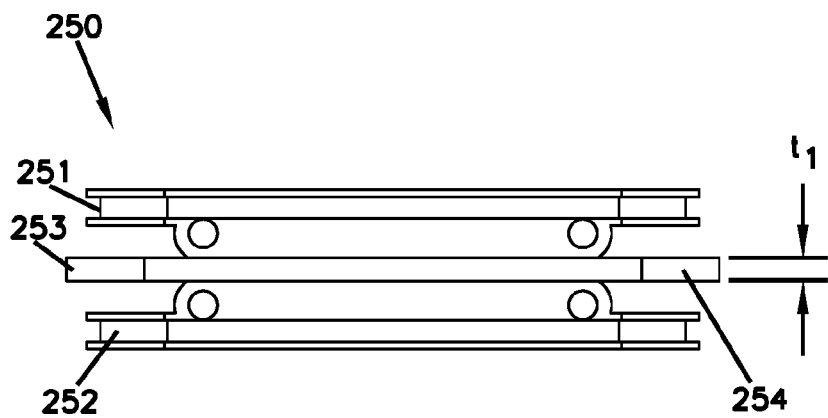
FIG. 5B is a side view of the stacking element of FIG. 5A.
Figure 5C:
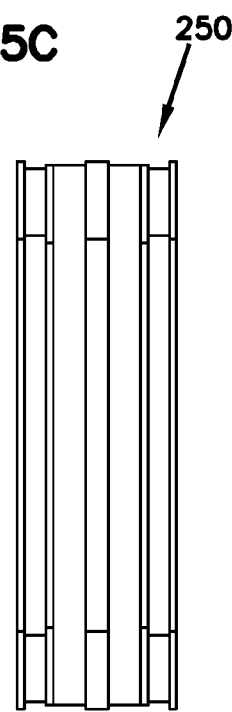
FIG. 5C is an end view of the stacking element of FIG. 5A.

FIG. 5A is a perspective view of a further embodiment of a stacking element 250 in accordance with the present disclosure. FIG. 5B is a side view of the stacking element 250 of FIG. 5A. FIG. 5C is an end view of the stacking element 250 of FIG. 5A.

Referring to FIGS. 5A-5C, the stacking element 250 includes a first member 251 adapted to enter the interior volume of a first enclosure module, a second member 252 adapted to enter the interior volume of a second enclosure module that is adjacent to the first enclosure module, and a third member 253 disposed between the first member and the second member. When the enclosure modules are stacked together, opposing sides of a protruding lip 254 of the third member 253 abut adjacent walls of the first and second enclosure modules when they are stacked together, the third member 253 thus being disposed exterior to the interior volumes of both the first and second enclosure modules. The first member 251, second member 252 and third member 253 form a unitary piece. Thus, the third member 253 effectively couples the first enclosure module to the second enclosure module, the third member closing off adjacent open stacking sides of the first and second enclosure modules from the exterior environment.

A channel 255, open at the top 256 and the bottom 257 of the stacking element 250 extends through the first, second, and third members (251, 252, 253) to provide communication between the interior volume of the first enclosure module and the interior volume of the second enclosure module. Optical fibers or other components can be passed internally between adjacent enclosure modules via the channel 255.

The third member 253 has a thickness from top to bottom $t_1$. In some examples of the enclosure assemblies of the present disclosure, the thickness $t_1$ is equivalent to the corresponding thickness of, e.g., the first member 237 of the stacking element 230 (FIG. 4); the corresponding thickness of the second member 221 of the stacking element 200 (FIG. 3B); the corresponding thickness of the first member 277 of the stacking element 270 (FIG. 6); and/or the corresponding thickness of the third member 293 of the stacking element 290 (FIG. 7). Thus, it should be appreciated that, for a given stack of enclosure modules, simple substitution of one of the disclosed embodiments of stacking elements for another of the disclosed embodiments of stacking elements in and of itself, at least in some examples does not alter the exterior dimensions of the stack taken as a whole.

Figure 6:
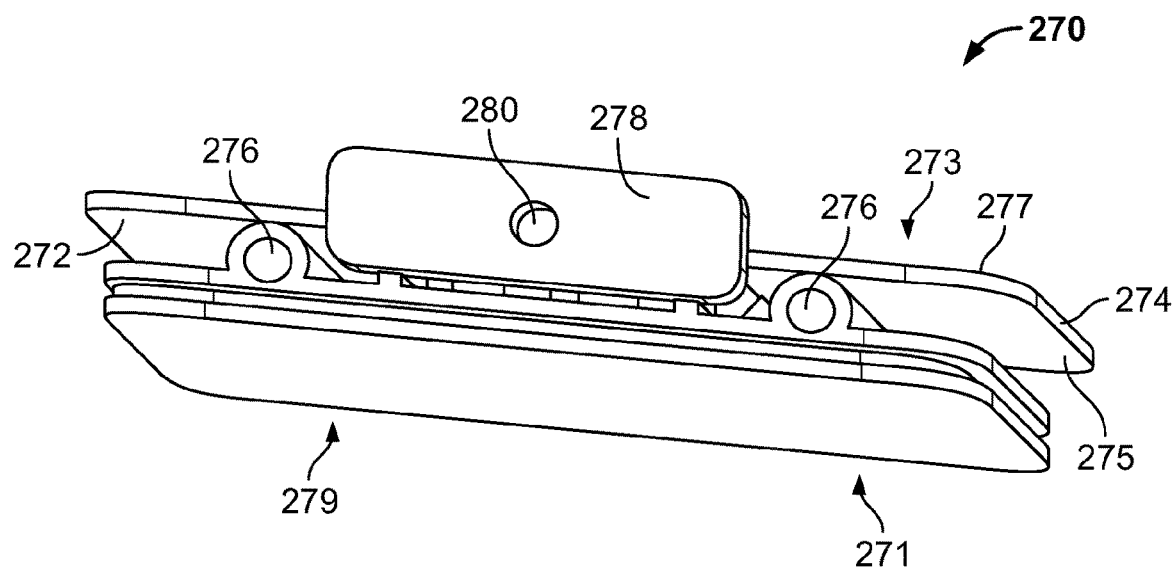
FIG. 6 is a bottom perspective view of a further embodiment of a stacking element in accordance with the present disclosure.
Figure 7:
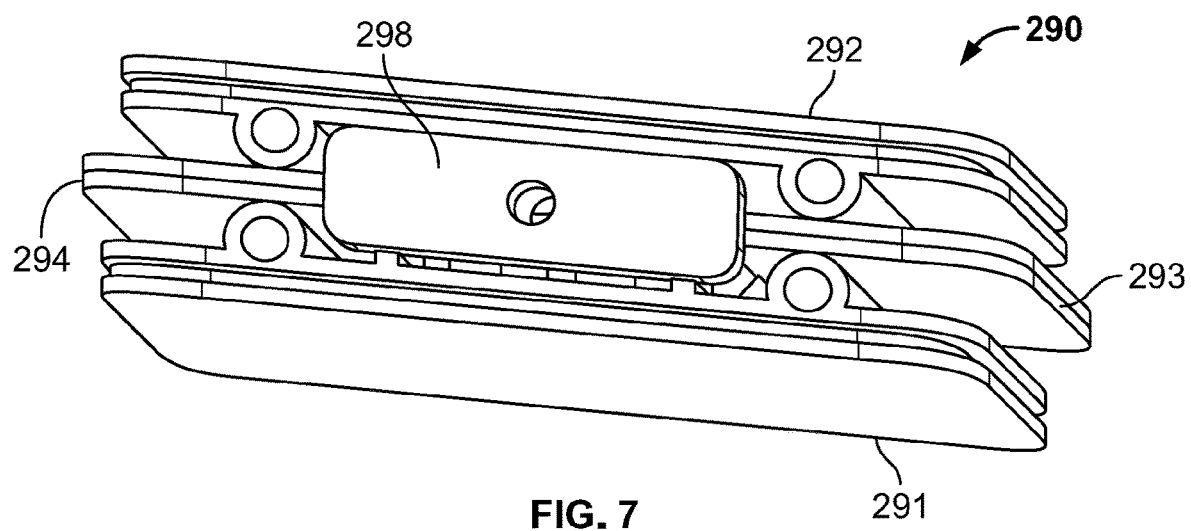
FIG. 7 is a perspective view of a further embodiment of a stacking element in accordance with the present disclosure.

FIG. 6 is a bottom perspective view of a further embodiment of a stacking element 270 in accordance with the present disclosure. The stacking element 270 has a top 271 and a bottom 273. A first member 277 configured to close off an open stacking side of an enclosure module includes a plate 272, the plate 272 having a protruding portion 274 around at least a portion of its perimeter. The undersurface 275 of the protruding portion 274 is configured to rest on a wall of an enclosure module, analogous to the protruding portion 234 of the stacking element 230, to effectively close off an open stacking side of an enclosure module. A second member 279 is configured to enter the interior volume of an enclosure module. One or more channels 276 of the second member 279 with openings can receive fasteners through corresponding holes in the wall(s) of an enclosure module to fasten the stacking element 270 to an enclosure module.

The stacking element 270 includes a plug 278. The plug 278 is shaped and configured to at least partially fill a cutout in a wall of an enclosure module, e.g., the cutout 122 in the enclosure module 102 (FIG. 1). To facilitate adaptability and stackability of the enclosure module 102, a cutout 122 in each of the opposing walls (112, 114) at the open stacking side 104 symmetrically matches a corresponding cutout in the walls (112, 114) at the closed stacking side 106. At the closed stacking side 106, these cutouts 122 can receive and accommodate the base 208 of the coupling component 202.

The stacking element 270 does not include a knuckle and groove stacking mechanism portion; rather the top of the plate 272 is flat or substantially flat, which can serve to cleanly terminate a stack of enclosure modules. For example, a bottom of a bottom enclosure module in a stack of enclosure modules can be fastened to an end piece (e.g., the end piece 120 of FIG. 1), while the uppermost enclosure module of the stack can be closed off at its upper end by the stacking element 270. In some examples, a hole 280 in the plug 278 is configured and positioned to communicate with a stacking mechanism (e.g., a knuckle/groove feature) of another component of the enclosure module stack, such as the stacking mechanism portion 118 of the base piece 120 (FIG. 1).

Stacks of enclosure modules can be modified and adapted to specific needs by, e.g., substituting one or more stacking elements 270 for one or more stacking elements 230.

FIG. 7 is a perspective view of a further embodiment of a stacking element 290 in accordance with the present disclosure.

Referring to FIG. 7, the stacking element 290 includes a first member 291 adapted to enter the interior volume of a first enclosure module, a second member 292 adapted to enter the interior volume of a second enclosure module that is adjacent to the first enclosure module, and a third member 293 disposed between the first member and the second member. When the enclosure modules are stacked together, opposing sides of a protruding lip 294 of the third member 293 abut adjacent walls of the first and second enclosure modules when they are stacked together, the third member 293 thus being disposed exterior to interior volumes of both the first and second enclosure modules. The first member 291, second member 292 and third member 293 form a unitary piece. Thus, the third member 293 effectively couples the first enclosure module to the second enclosure module, the third member closing off adjacent open stacking sides of the first and second enclosure modules from the exterior environment.

Unlike the stacking element 250, the stacking element 290 does not have a channel extending through the first, second, and third members. Thus, the interior volumes of adjacent enclosure modules coupled by a stacking element 290 cannot communicate with each other via the stacking element 290. Stacks of enclosure modules can be modified and adapted to specific needs by, e.g., substituting one or more stacking elements 290 for one or more stacking elements 250. In addition, the stacking element 290 includes a plug 298. The plug 298 is shaped and configured to at least partially fill adjacent cutouts (e.g., the adjacent cutouts 122 in FIG. 9) in adjacent walls of adjacent enclosure modules that are straddled by the stacking element 290.

Figure 8:
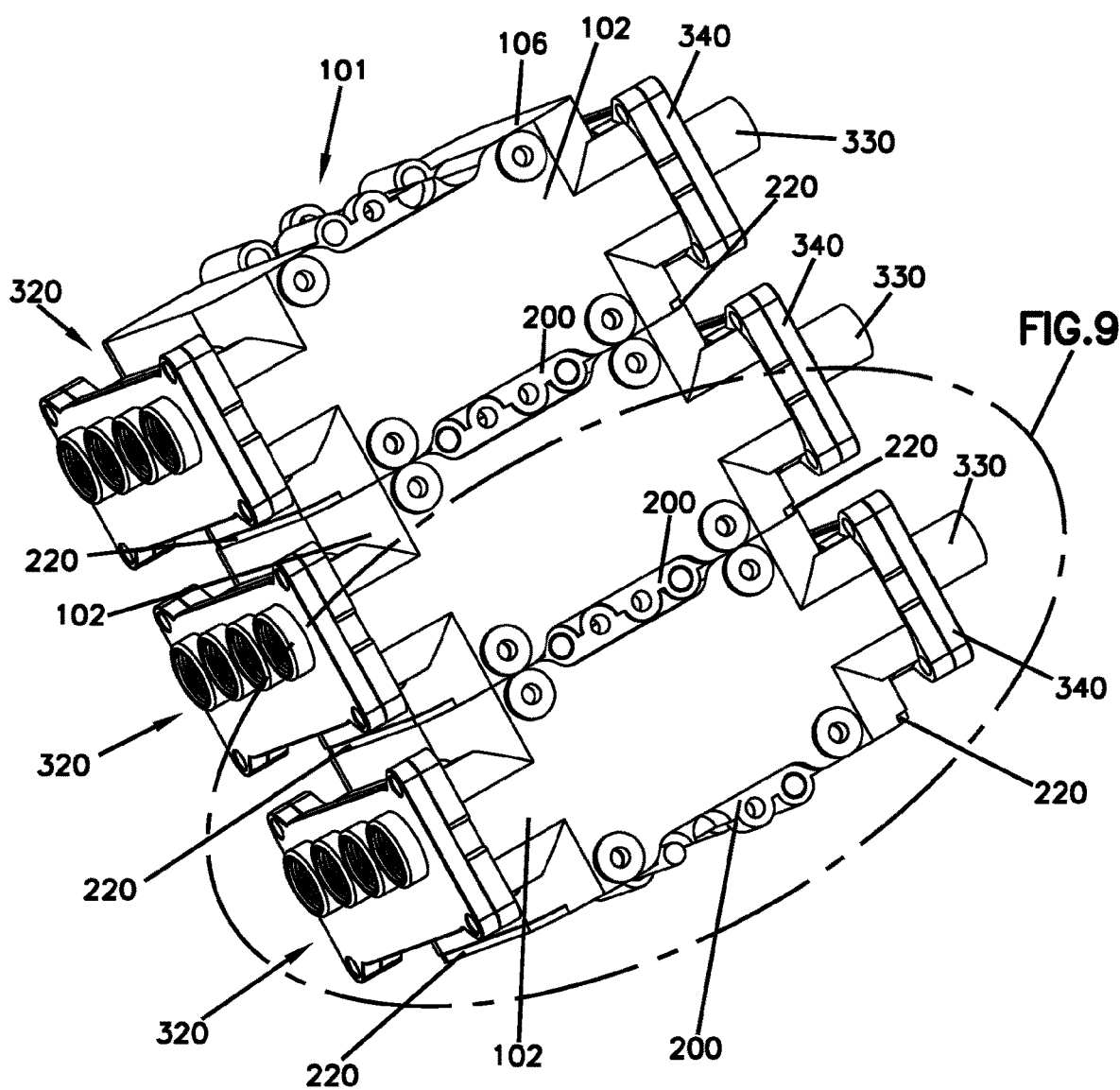
FIG. 8 is a perspective view of a portion of the telecommunications system of FIG. 1 in which the enclosure modules are in a stacked and coupled configuration.
Figure 9:
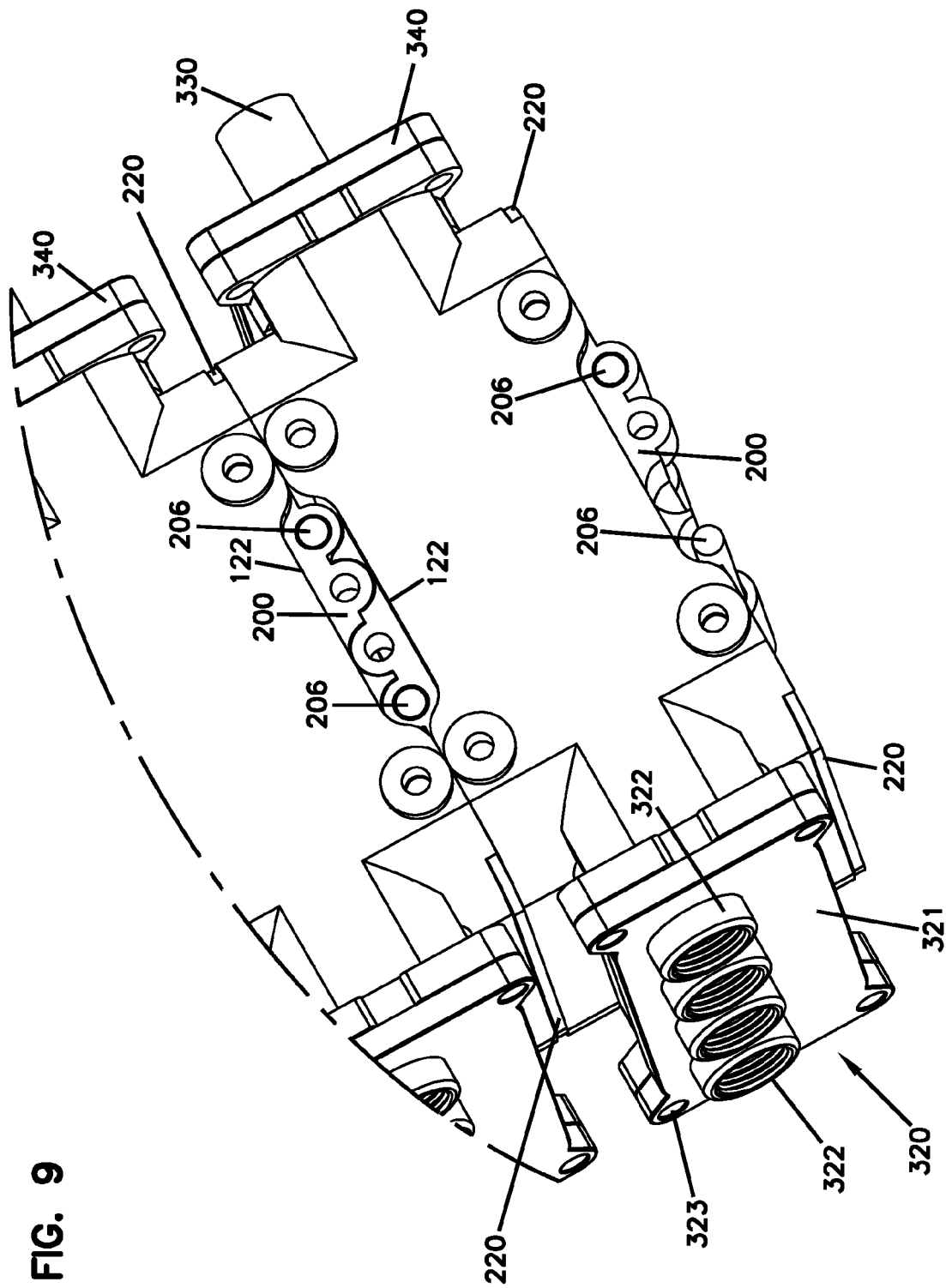
FIG. 9 is an enlarged view of the call-out portion of FIG. 8.

FIG. 8 is a perspective view of a portion of the telecommunications system 100 of FIG. 1 in which the enclosure modules 102 are in a stacked and coupled configuration. FIG. 9 is an enlarged view of the call-out portion of FIG. 8.

Referring to FIGS. 8-9, the system 100 has a top 101, and three identical enclosure modules 102 oriented the same way and coupled together by two stacking elements 200 having protruding lips 220 as described above. Knuckle and groove structures of the closed coupling sides 106 nested with the knuckle and groove structures of the stacking elements 200 are visible through the cutouts 122. Free ends of the pins 206 (i.e., the ends opposite the base 208) are also visible.

As further shown in FIGS. 8-9, the second openings 110 (FIG. 2) of the enclosure modules 102 are covered by covers 320. The cover 320 includes a plate 321 that is removably mountable (e.g., with fasteners and fastener through holes 323) over the opening 110 of an enclosure module.

The cover 320 includes a plurality of ports 322. The ports 322 can be equipped with telecommunications hardware (e.g., one or more optical fiber termination/connectorizing elements) to route or transmit data to or from the interior volume of the enclosure module 102.

Additional covers 340 cover the first openings 108 (FIG. 1) of the enclosure modules 102. The cover 340 includes a plate 341 that is removably mountable over the opening 110 of the enclosure module. The cover 340 includes a port at which cable seal 330 is supported. An input cable (e.g., a feeder cable), can interface with the module 102 and sealingly enter its interior volume via the port in the cover 340. Within the interior volume, fibers from the cable can be managed in any desired manner.

Figure 10:
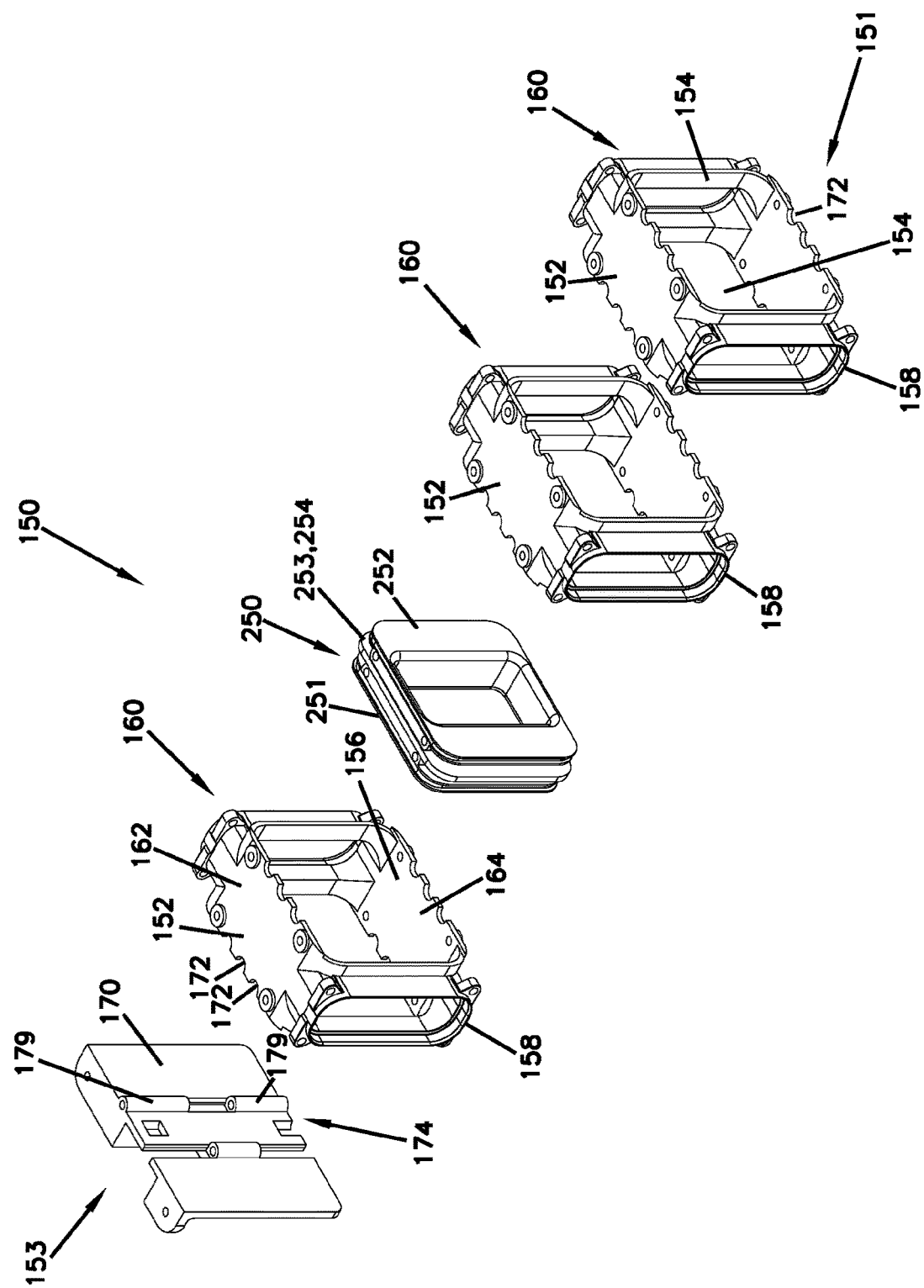
FIG. 10 is a top perspective exploded view of a further example telecommunications system in accordance with the present disclosure.
Figure 11:
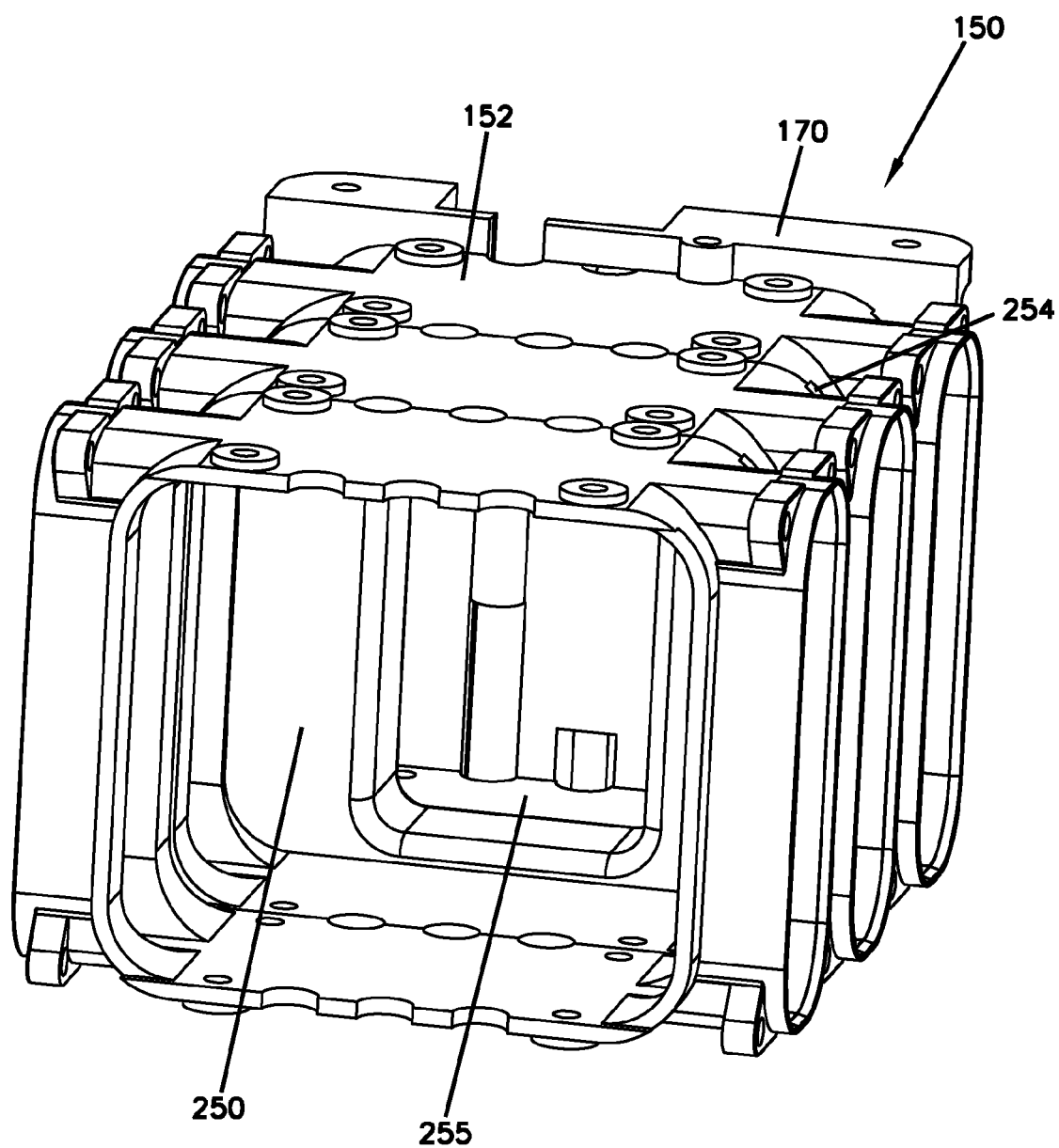
FIG. 11 is a top perspective view of the telecommunications system of FIG. 10 in which the enclosure modules are in a stacked and coupled configuration.

FIG. 10 is a top perspective, exploded view of a further example telecommunications system 150 in accordance with the present disclosure. FIG. 11 is a top perspective view of the telecommunications system 150 of FIG. 10 in which the enclosure modules are in a stacked and coupled configuration. The system 150 has a top 151 and a bottom 153.

Referring to FIGS. 10-11, the system 150 includes a plurality of enclosure modules 152 that can be removably coupled to one another to form a stack of enclosure modules. In this example system 150, all of the enclosure modules 152 have the same configuration. The enclosure module 152 is a variation of the enclosure module 102.

Each of the enclosure modules 152 includes two opposing open stacking sides 154, a first opening 158, and a second opening 160 that is opposite the first opening. Opposing side walls 162 and 164 join the open stacking sides 154, such that the enclosure module 152 is essentially a block-like housing defining an interior volume 156.

At the top and the bottom edges of each of the opposing side walls 162 and 164 are notches 172. The notches 172 are configured to align with a stacking mechanism, such as the knuckle and groove stacking mechanism 174 of the base piece 170 of the stack. For example, the knuckles 179 of the base piece/mounting bracket 170 can be received by the notches 172.

However, the notches need not be so aligned. For example, the first member 251 and the second member 252 of the stacking element 250 are configured to cover up the notches 172 in adjacent sidewalls of adjacent enclosure modules 150 in the stack.

Referring to FIG. 11, for the sake of illustration, just a single stacking element 250 is showing, coupling two of the three enclosure modules 152 in a communicative manner such that the interior volumes of the adjacent enclosure modules 152 are open to each other. It should be appreciated that the stack can have any number of enclosure modules 152, and a stacking element 250 can couple each adjacent pair of enclosure modules 152 in the stack.

When the enclosure modules 152 are stacked together, as shown in FIG. 11, opposing sides of a protruding lip 254 of the third member 253 abut adjacent walls of the first and second enclosure modules when they are stacked together, the third member 253 thus being partially disposed exterior to the interior volumes of both the first and second enclosure modules. The first member 251, second member 252 and third member 253 can form a unitary piece. Thus, the third member 253 effectively couples the two adjacent enclosure modules 152, the third member 153 closing off adjacent open stacking sides of those two enclosure modules. The channel 255 provides communication between the interior volumes 156 enclosure modules 152 straddled by the stacking element 250. Optical fibers or other components can be passed internally between adjacent enclosure modules via the channel 255.

Figure 12:
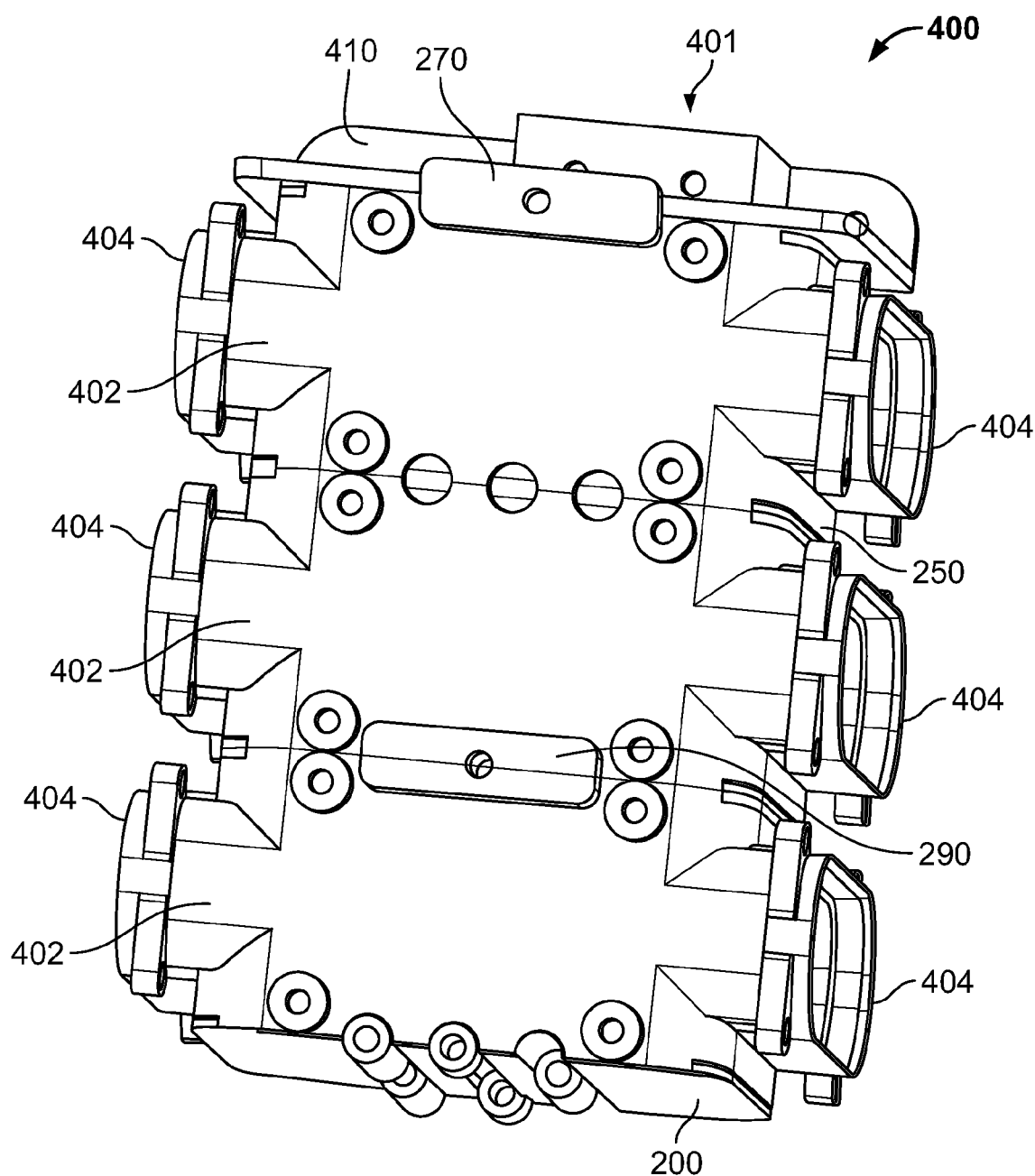
FIG. 12 is a perspective view of a further example stack of module housings, including stacking elements and a mounting bracket in accordance with the present disclosure.

FIG. 12 is a perspective view of a further example stack 400 of a further configuration of module housing 402. The module housing 402 includes front and back opposing coverable openings 404 through which exterior telecommunications equipment can interface with the interior volume defined by the housing 402. The stack 400 has a bottom 401 and includes three module housings 402 coupled together. Even though the three module housings shown in the stack 400 are identical, four different stacking elements are shown in the stack, including the stacking elements 200, 290, 250, and 270. A further configuration of a mounting bracket 401 is at the bottom 401 of the stack 400 is configured to couple to the stacking element 270.

Figure 13:
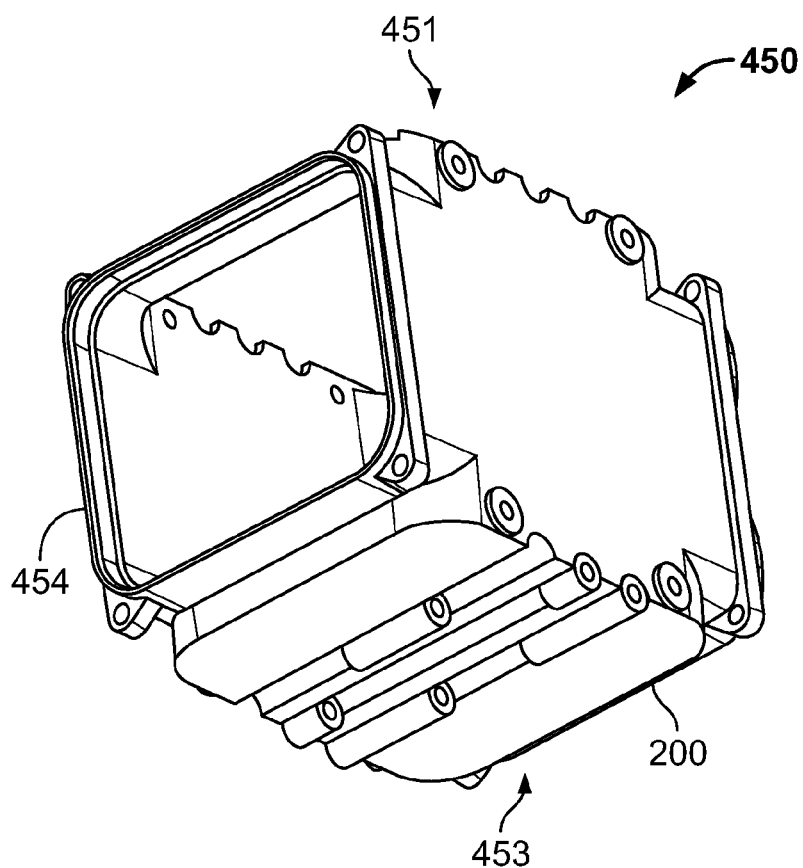
FIG. 13 is a perspective view of a further example housing module in accordance with the present disclosure.

FIG. 13 is a perspective view of a further example housing module 450 in accordance with the present disclosure. The housing module 450 has a top 451 and a bottom 453, and has the same configuration as the housing module 152, except that the housing module 450 is longer from top to bottom than the housing module 152, providing for larger coverable openings 454. A stacking element 200 (discussed above) is shown installed at the bottom of the housing module 450.

Figure 14:
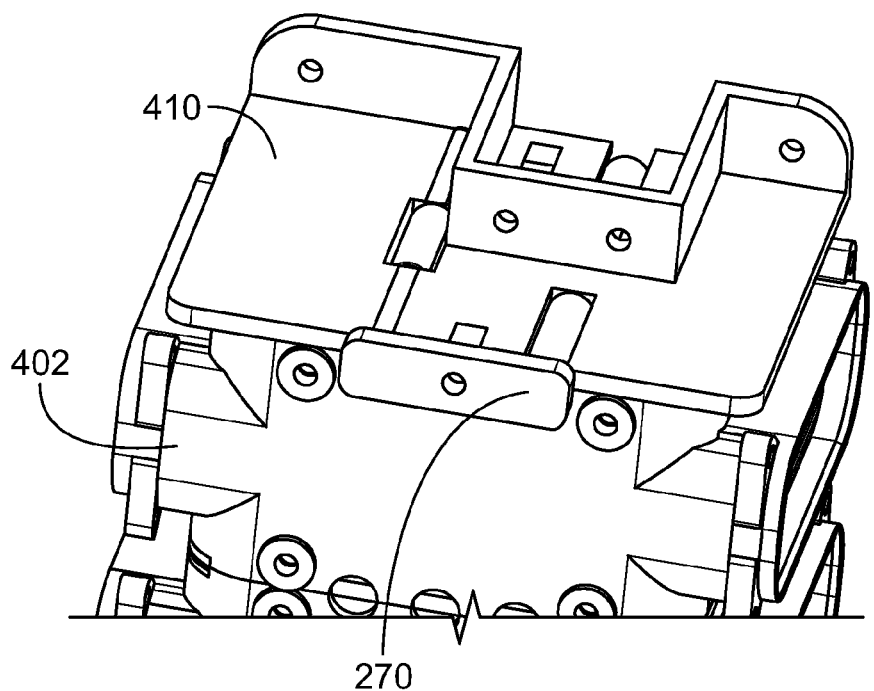
FIG. 14 is perspective view of a portion of the example stack of FIG. 12, showing the mating of an example stacking element and an example mounting bracket.
Figure 15:
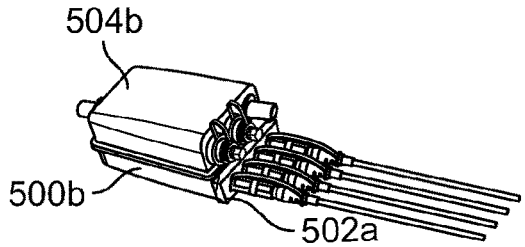
FIG. 15 shows a first example assembled combination of a housing module, a housing module lid, a housing module cover, and cable/fiber terminations in accordance with the present disclosure.
Figure 16:
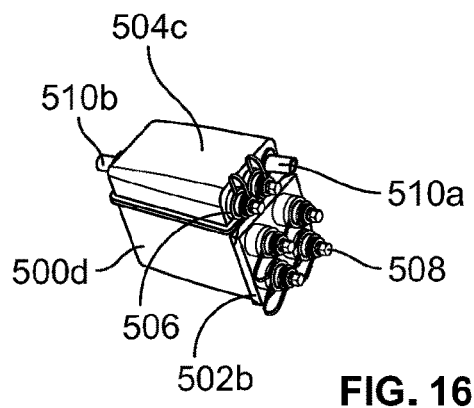
FIG. 16 shows a second example assembled combination of a housing module, a housing module lid, a housing module cover, and cable/fiber terminations in accordance with the present disclosure.
Figure 17:
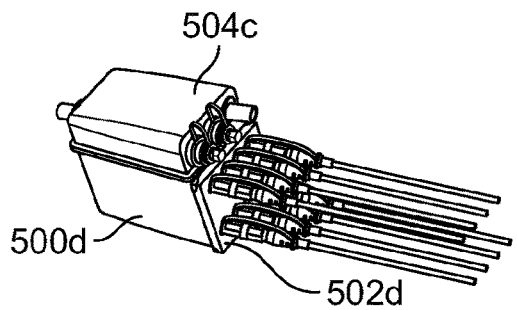
FIG. 17 shows a third example assembled combination of a housing module, a housing module lid, a housing module cover, and cable/fiber terminations in accordance with the present disclosure.
Figure 18:
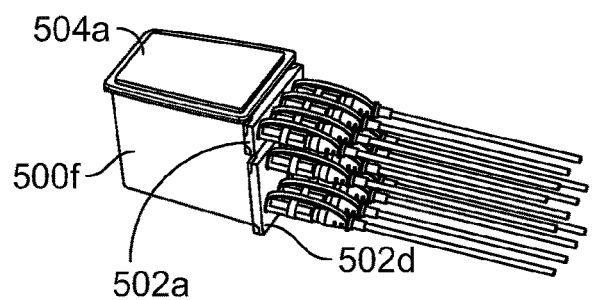
FIG. 18 shows a fourth example assembled combination of a housing module, a housing module lid, a housing module cover, and cable/fiber terminations in accordance with the present disclosure.
Figure 19:
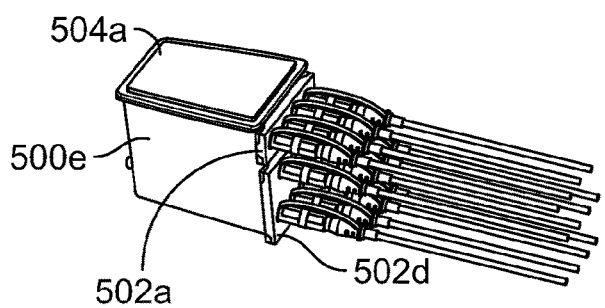
FIG. 19 shows a fifth example assembled combination of a housing module, a housing module lid, a housing module cover, and cable/fiber terminations in accordance with the present disclosure.
Figure 20:
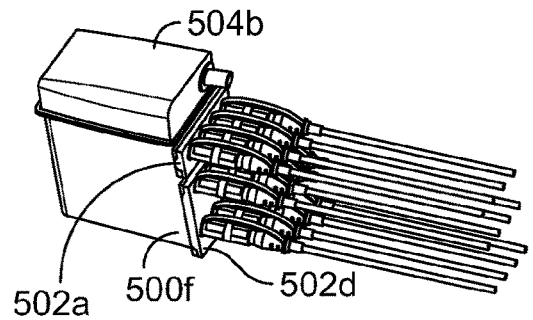
FIG. 20 shows a sixth example assembled combination of a housing module, a housing module lid, a housing module cover, and cable/fiber terminations in accordance with the present disclosure.
Figure 21:
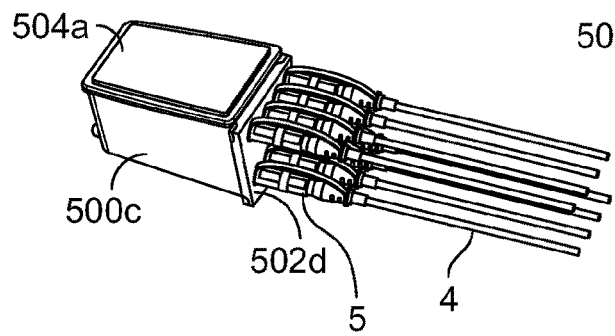
FIG. 21 shows a seventh example assembled combination of a housing module, a housing module lid, a housing module cover, and cable/fiber terminations in accordance with the present disclosure.
Figure 22:
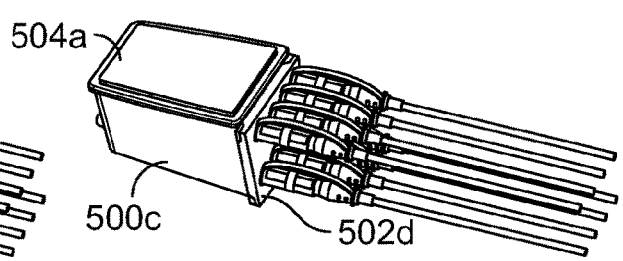
FIG. 22 shows an eighth example assembled combination of a housing module, a housing module lid, a housing module cover, and cable/fiber terminations in accordance with the present disclosure.
Figure 23:
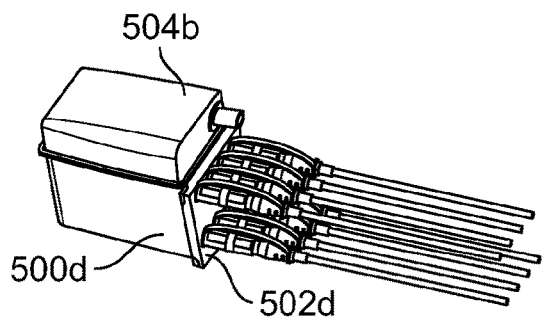
FIG. 23 shows a ninth example assembled combination of a housing module, a housing module lid, a housing module cover, and cable/fiber terminations in accordance with the present disclosure.
Figure 24:
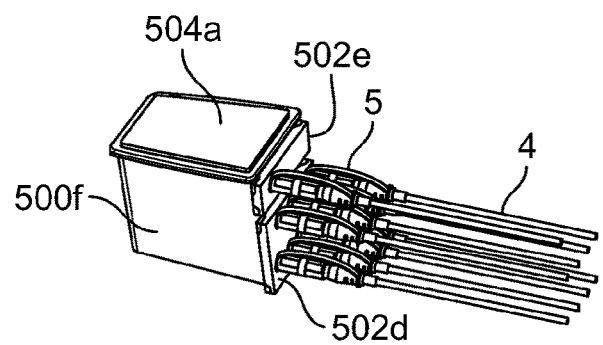
FIG. 24 shows a tenth example assembled combination of a housing module, a housing module lid, a housing module cover, and cable/fiber terminations in accordance with the present disclosure.
Figure 25:
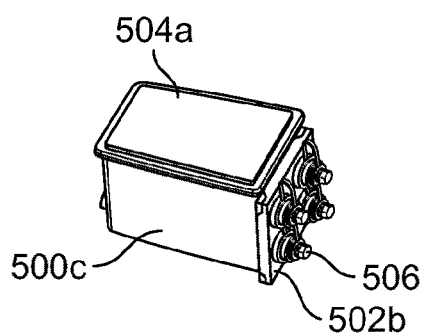
FIG. 25 shows an eleventh example assembled combination of a housing module, a housing module lid, a housing module cover, and cable/fiber terminations in accordance with the present disclosure.
Figure 26:
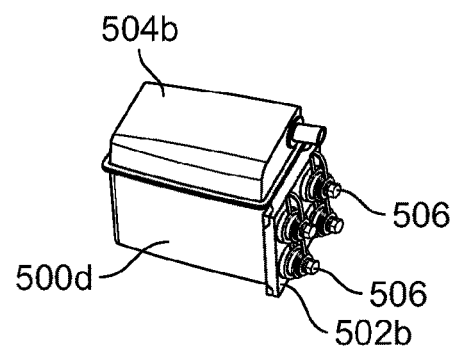
FIG. 26 shows a twelfth example assembled combination of a housing module, a housing module lid, a housing module cover, and cable/fiber terminations in accordance with the present disclosure.
Figure 27:
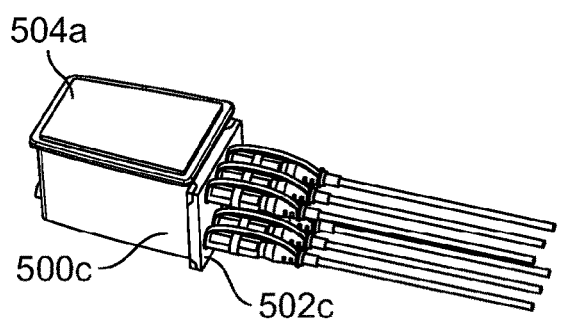
FIG. 27 shows a thirteenth example assembled combination of a housing module, a housing module lid, a housing module cover, and cable/fiber terminations in accordance with the present disclosure.
Figure 28:
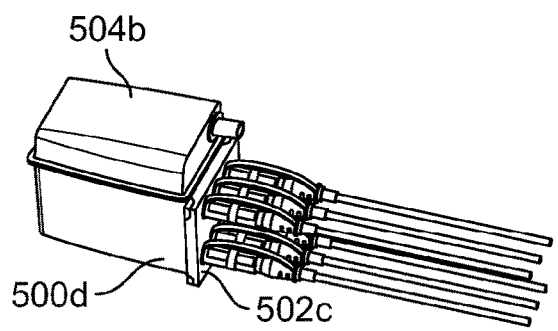
FIG. 28 shows a fourteenth example assembled combination of a housing module, a housing module lid, a housing module cover, and cable/fiber terminations in accordance with the present disclosure.
Figure 29:
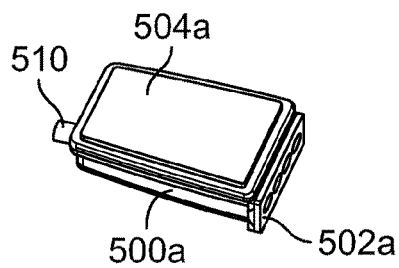
FIG. 29 shows a fifteenth example assembled combination of a housing module, a housing module lid, a housing module cover, and cable/fiber terminations in accordance with the present disclosure.
Figure 30:
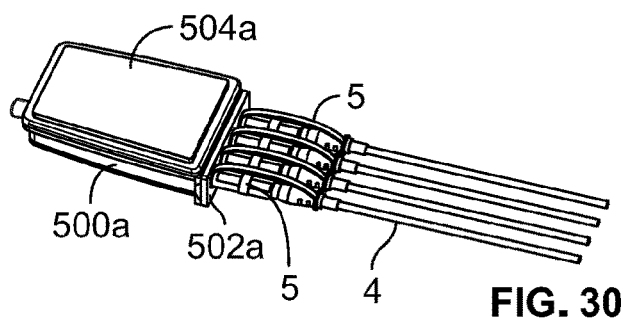
FIG. 30 shows a sixteenth example assembled combination of a housing module, a housing module lid, a housing module cover, and cable/fiber terminations in accordance with the present disclosure.
Figure 31:
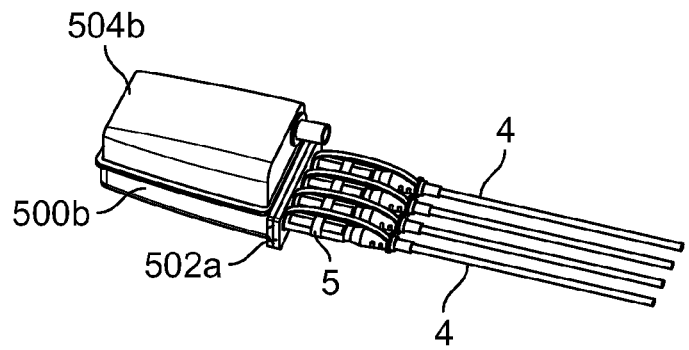
FIG. 31 shows a seventeenth example assembled combination of a housing module, a housing module lid, a housing module cover, and cable/fiber terminations in accordance with the present disclosure.
Figure 32:
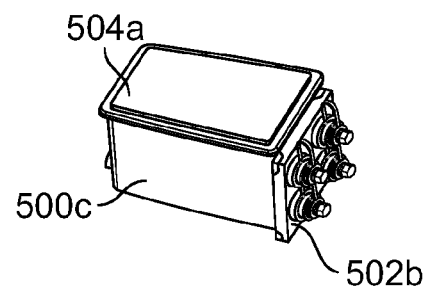
FIG. 32 shows an eighteenth example assembled combination of a housing module, a housing module lid, a housing module cover, and cable/fiber terminations in accordance with the present disclosure.
Figure 33:
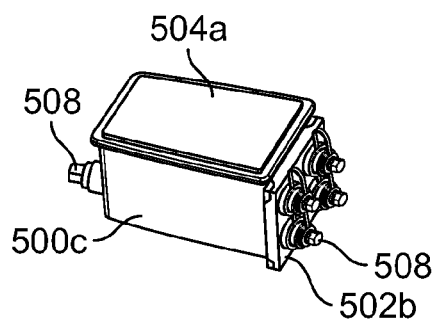
FIG. 33 shows a nineteenth example assembled combination of a housing module, a housing module lid, a housing module cover, and cable/fiber terminations in accordance with the present disclosure.
Figure 34:
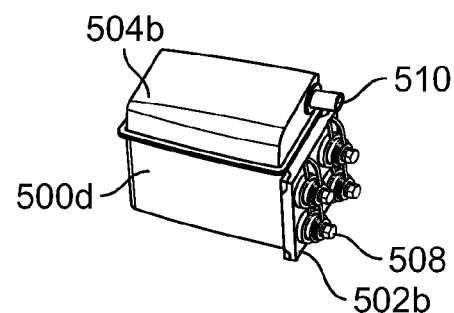
FIG. 34 shows a twentieth example assembled combination of a housing module, a housing module lid, a housing module cover, and cable/fiber terminations in accordance with the present disclosure.

FIG. 14 is a perspective view of a portion of the example stack 400 of FIG. 12, showing a nesting of the stacking element 270 and the mounting bracket 410.

FIGS. 15-34 show twenty example combinations of various housing modules, housing module lids, housing module covers, and cable/fiber terminations in accordance with the present disclosure. The different housing modules shown in FIGS. 15-34 can be stacked together with stacking elements. Portions of the housing modules, which can include a lid, can be adapted to receive stacking elements, as described in more detail below, to provide stacking capability for the various combinations of FIGS. 15-34.

Referring to FIGS. 15-34, the combinations are made from various housing modules (500a, 500b, 500c, 500d, 500e, 5000) coupled to various connectorized or non-connectorized housing module covers (502a, 502b, 502c, 502d, 502e) in accordance with the present disclosure. Each of the modules also includes a lid selected from a variety of configurations of lids (504a, 504b, 504c).

The modules (500a, 500b, 500c, 500d, 500e, 5000) can be interchangeable and differ from one another with respect to one or more of: the module's size; the location, size, and number of openings in the module that receive a cover; and the existence, nonexistence, and/or placement of a cable port in the module itself. With respect to the cable ports disposed in the modules themselves, for example, the cable port can be an input or an output port and can be disposed on the same side of the module as the cover or on a different side of the module than the cover. In addition, a given module can be provided with zero, one or more cable ports.

The covers (502a, 502b, 502c, 502d, 502e) can be interchangeable and differ from one another with respect to one or more of the cover's: shape; size; and number, placement and type of ports. The ports of some of the covers can be plugged with plugs. For example, the plugs 506 are each plugging multi-fiber connector output ports, while the plugs 508 are plugging single-fiber connector output ports. It should also be appreciated that the ports disposed in the modules themselves can also be plugged as shown, e.g., with respect to the combination assembly 550, which has four plugged single-fiber output ports disposed in a cover of the module and one plugged input port in the module itself.

The lids (504a, 504b, 504c) can be interchangeable and differ from one another with respect to size and function. Thus, for example, the lids 504b and 504c define a substantial interior volume that effectively substantively extends the interior volume of the module to which it is coupled. In addition, for example, the lid 504a does not support a port for fiber optic connectivity; while the lid 504b includes a cable seal 510 at an input port on the same side of the module as the output ports of the cover; and the lid 504c includes a first cable seal 510a at an input/output port on the same side of the module as the output ports and the cover, as well as two multi-fiber output ports adjacent the first cable seal 504a, as well as a second cable seal 504b at a different side of the module.

It should be appreciated that the combinations of FIGS. 15-34 represent particular non-limiting examples of how to combine a module, a cover, and a lid, for a given set of configurations of modules, a given set of configurations of covers, and a given set of configurations of lids according to a desired application of optical fiber management and the manner(s) in which the interior volume of the module(s) is/are to be used.

Still referring to the combinations of FIGS. 15-34, in some of the depicted combinations, portions of various numbers of drop cables 4 are shown terminated at ruggedized connectors 5, which are connected to ports in the module covers.

Figure 37A:
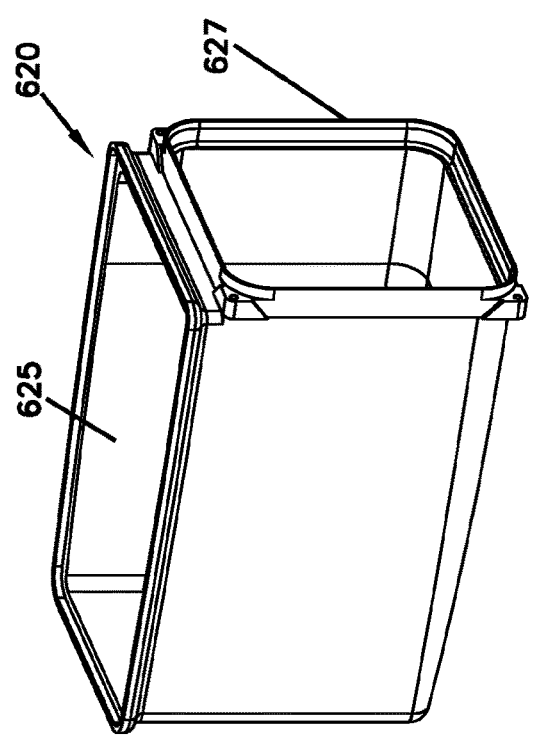
FIG. 37A is a front, top perspective view of a further example housing module configuration in accordance with the present disclosure.
Figure 38:
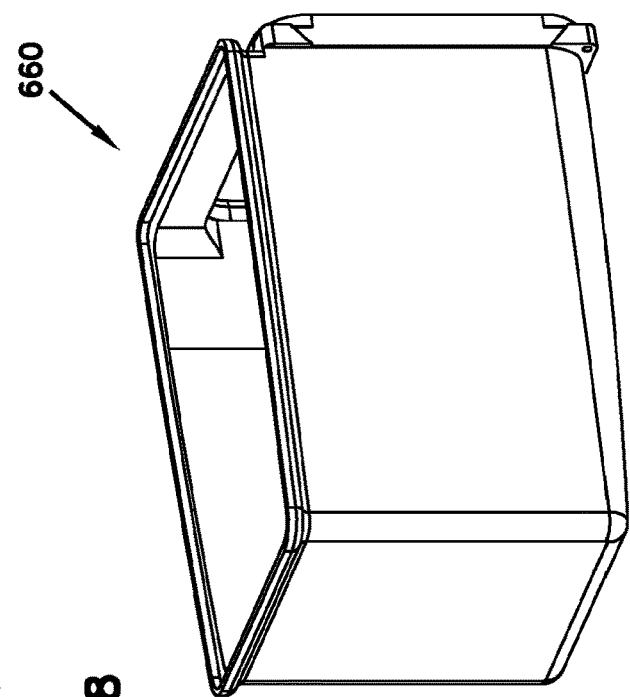
FIG. 38 is a rear, top perspective view of a further example housing module configuration in accordance with the present disclosure.
Figure 37B:
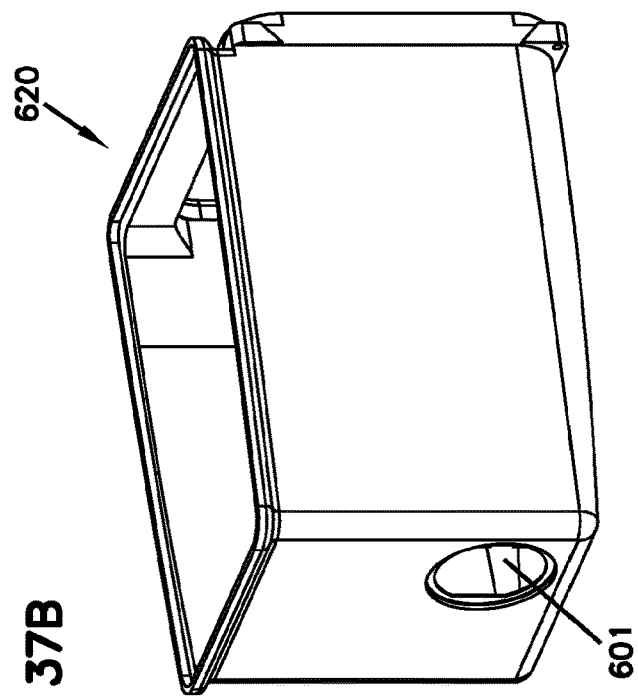
FIG. 37B is a rear, top perspective view of the housing module of FIG. 37A.

FIG. 35A is a front, top perspective view of an example housing module 600 configuration in accordance with the present disclosure. FIG. 35B is a rear, top perspective view of the housing module 600 of FIG. 35A. FIG. 36 is a rear, top perspective view of a further example housing module 650 configuration in accordance with the present disclosure. FIG. 37A is a front, top perspective view of a further example housing module 620 configuration in accordance with the present disclosure. FIG. 37B is a rear, top perspective view of the housing module 620 of FIG. 37A. FIG. 38 is a rear, top perspective view of a further example housing module 660 configuration in accordance with the present disclosure. FIG. 39A is a front, top perspective view of a further example housing module 640 configuration in accordance with the present disclosure. FIG. 39B is a rear, top perspective view of the housing module 640 of FIG. 39A. FIG. 40 is a rear, top perspective view of a further example housing module configuration 670 in accordance with the present disclosure.

The modules 600, 620, 640 differ, respectively, from the modules, 650, 660, and 670 with respect to the presence or absence of a port 601 disposed in a side of the module itself. The port 601 can provide an interface for fiber optic connectivity between the interior volume (605, 625, 645) of the modules, and the exterior of the modules. In some examples, the port 601 can support a cable seal for sealingly receiving a cable entering the interior volume.

The pairs of module housings 600 and 650, 620 and 660, and 640 and 670 differ with respect to the size of the interior volume they define, and the number and size of the openings at the front (607, 627, 647) of the module. In addition, the module housings 600 and 650 are adapted for stacking with other modules, the module housing 600, 650 being provided with a recess 609 in its bottom 611 to receive a stacking element.

Figure 41:
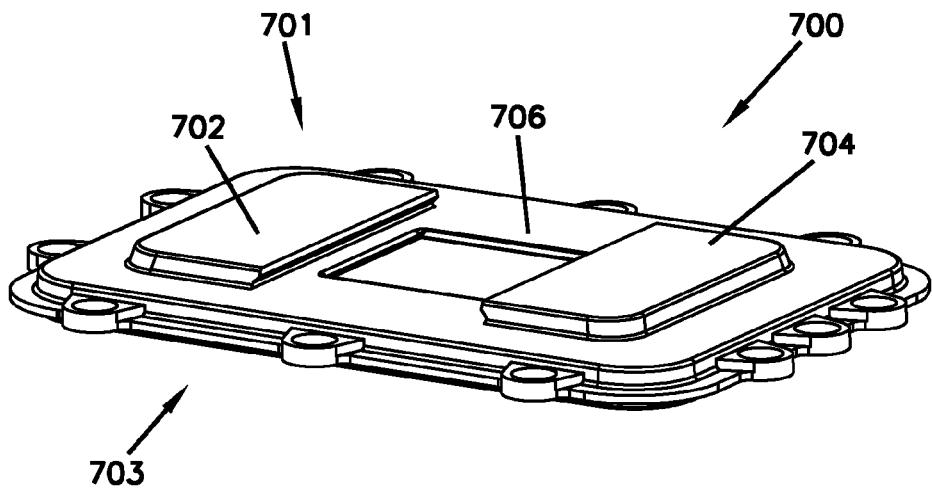
FIG. 41 is a top perspective view of an example housing module lid configuration in accordance with the present disclosure.

FIG. 41 is a top perspective view of an example housing module lid 700 in accordance with the present disclosure. The lid 700 has a top 701 and a bottom 703. Shoulders 702 and 704 on the top 701 define a recess 706 therebetween. The recess 706 is configured to receive a portion of a stacking element, as described further below.

Figure 42A:
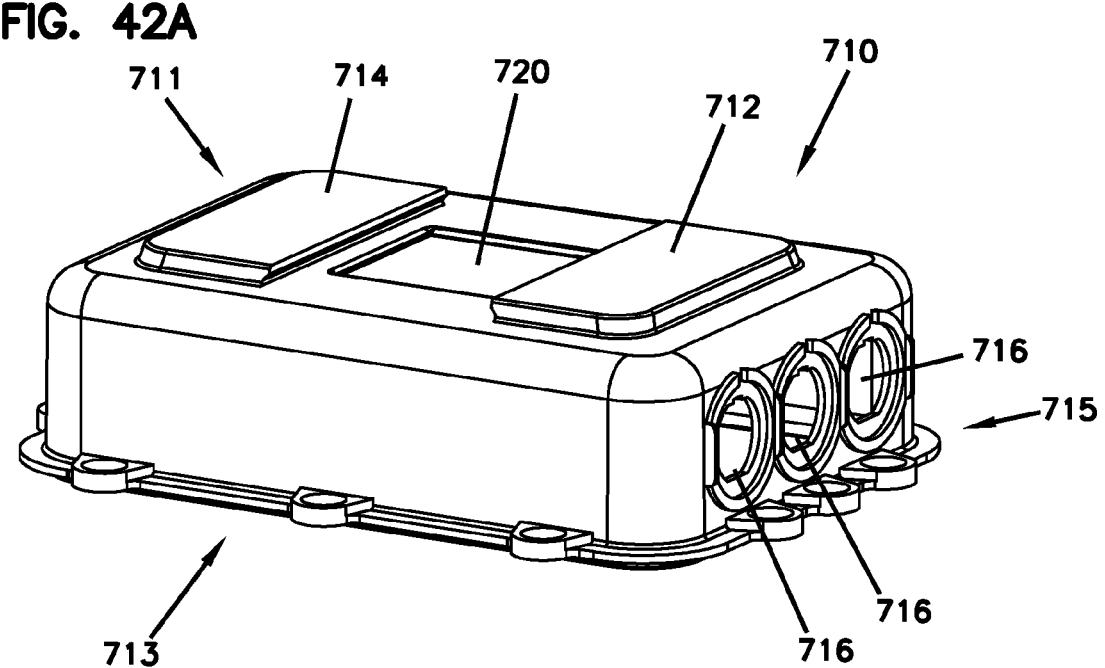
FIG. 42A is a front, top perspective view of a further example housing module lid in accordance with the present disclosure.
Figure 43:
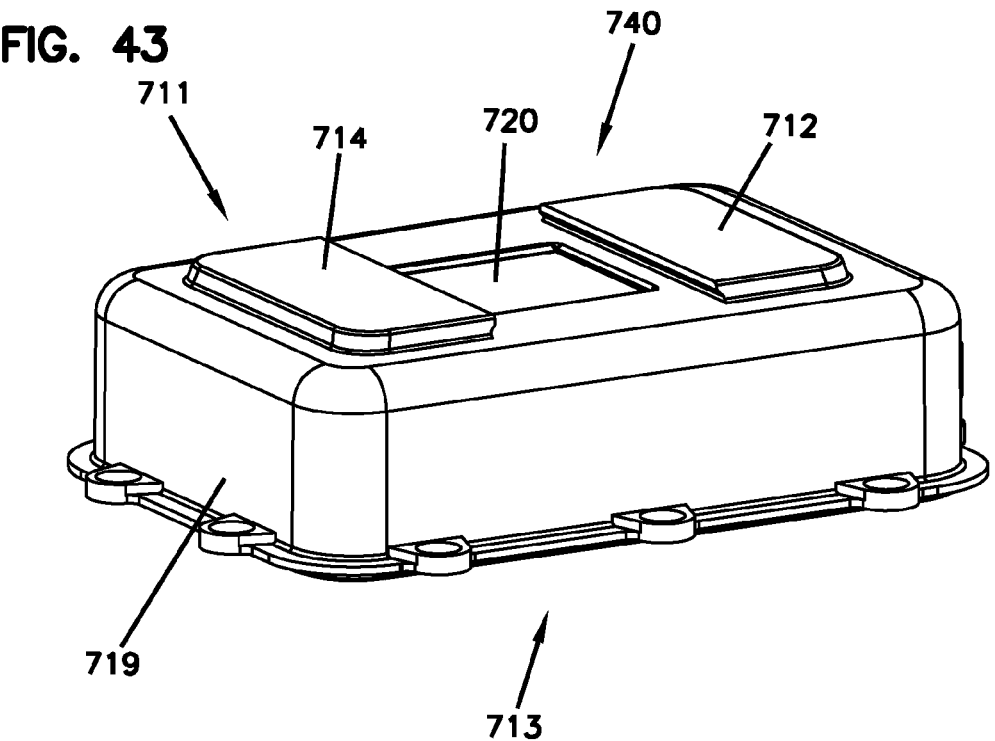
FIG. 43 is a rear, top perspective view of a further example housing module lid in accordance with the present disclosure.
Figure 42B:
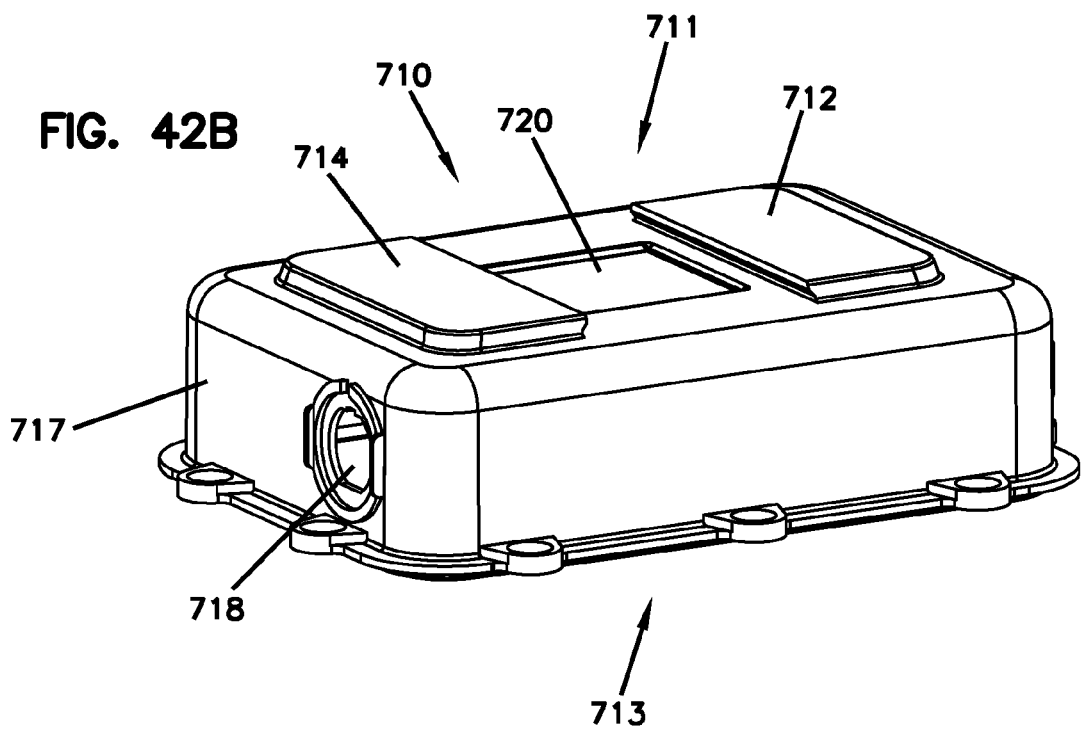
FIG. 42B is a rear, top perspective view of the housing module lid of FIG. 42A.

FIG. 42A is a front, top perspective view of a further example housing module lid 710 in accordance with the present disclosure. FIG. 42B is a rear, top perspective view of the housing module lid 710 of FIG. 42A. FIG. 43 is a rear, top perspective view of a further example housing module lid 740 in accordance with the present disclosure.

The lids 710 and 740 have a top 711, a bottom 713, a front 715, and a back (717, 719). Unlike the module lid 700, the lids 710 and 740 have walls between the top 711 and the bottom 713 that define an interior volume which, when the lid is coupled to a module housing, can effectively expand the interior volume of the module. Thus, the interior volume defined by the walls of the lids 710 and 740 can be thought of as a module expansion volume. In addition, unlike the lid 700, the lids 710 and 740 include ports. A series of front ports 716 are configured to receive optical fiber connectorization elements or non-connectorized portions of cables and thereby provide an additional interior to exterior interface for the module to which the lid 710, 740 is attached.

The back 717 of the lid 710 includes a rear port 718, which likewise serves as an interface for connectorized or non-connectorized portions of optical cables. The back 719 of the lid 740 does not include a rear port. Otherwise the constructions of the lid 710 and the lid 740 are identical.

The top 711 of the lids 710 and 740 has the same configuring as the top 701 of the lid 700. Shoulders 712 and 714 on the top 711 define a recess 720 therebetween. The recess 720 is configured to receive a portion of a stacking element, as described further below. In some examples, the recess 720 is configured to receive the same configuration of stacking element as the recess 706. Thus, it should be appreciated that, in some examples, different lids can be interchanged while still providing stackability of the modules that they cover.

Figure 44:
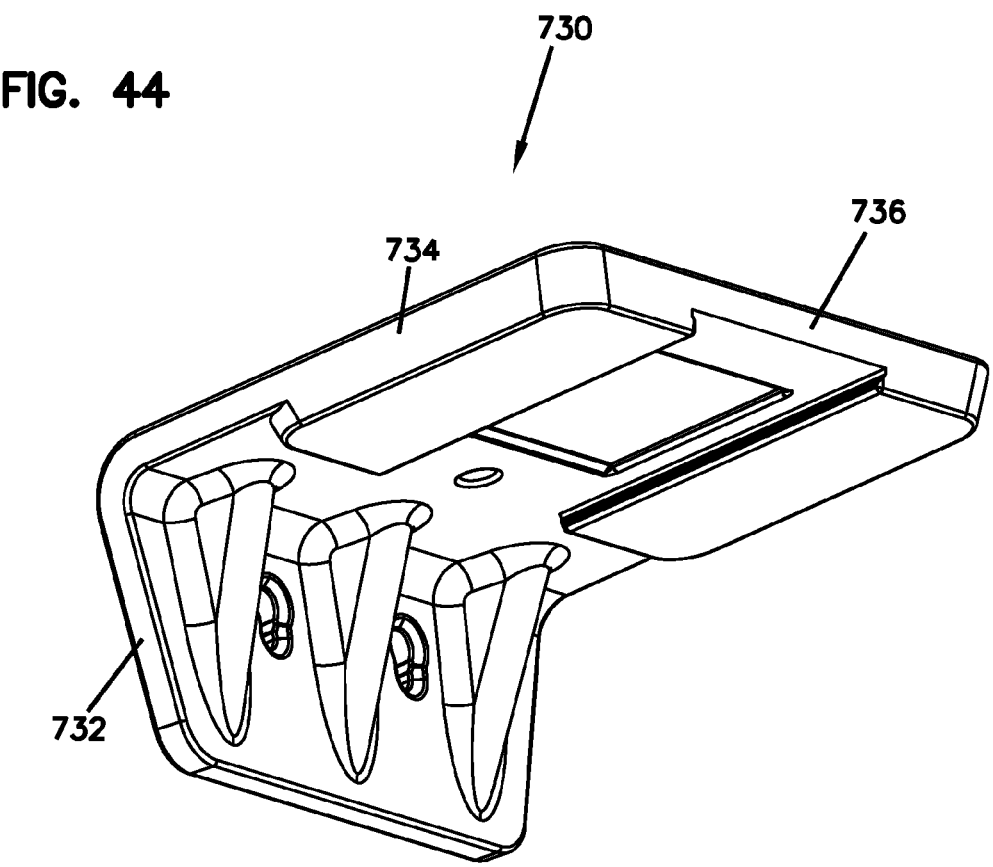
FIG. 44 is a bottom perspective view of an example stack mounting bracket in accordance with the present disclosure.

FIG. 44 is a bottom perspective view of an example stack mounting bracket 730 in accordance with the present disclosure. The bracket 730 can be used to terminate a module or stack of modules and mount the module or stack of modules to a structure. The bracket 730 includes a stacking leg 734 from which extends a mounting foot 732. The mounting foot 732 can be positioned on, and mounted to, a structure such as a wall, ceiling, cabinet, frame, e.g., with fasteners. The stacking leg 734 includes a recess 736 adapted to receive a portion of a stacking element. It should be appreciated that the recess 736 can have an identical configuration to that of the recess (706, 720) in the lids and/or the identical configuration of a recess in a module itself.

Figure 45:
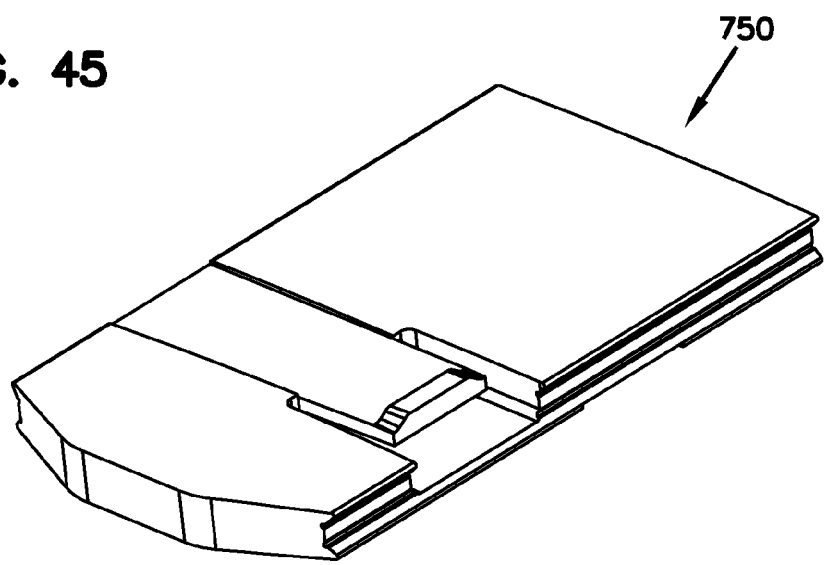
FIG. 45 is a perspective view of a further example of a stacking element in accordance with the present disclosure, the stacking element being compatible with one or more of the mounting brackets, housing modules, and/or lids of the present disclosure.
Figure 46:
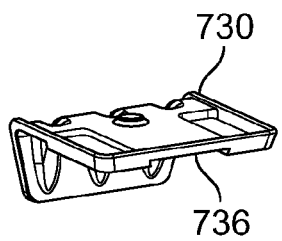
FIG. 46 depicts a stage of an example housing module assembly stacking in accordance with the present disclosure.
Figure 47:
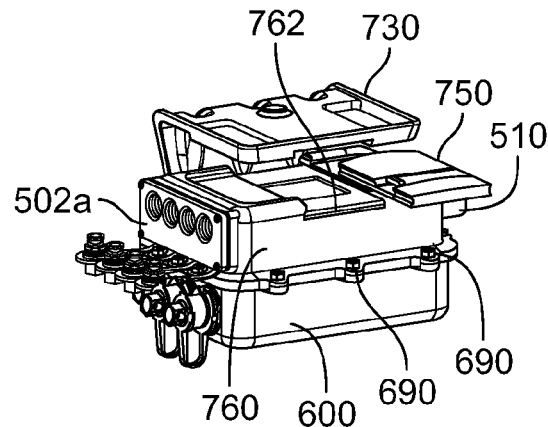
FIG. 47 depicts a further stage of the stacking of FIG. 46.
Figure 48:
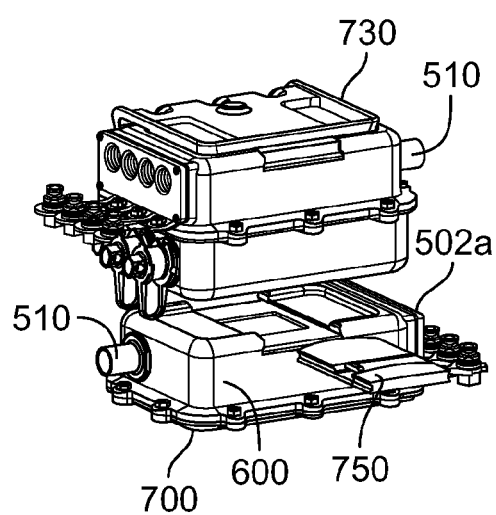
FIG. 48 depicts a further stage of the stacking of FIGS. 46 and 47.

FIG. 45 is a perspective view of a further example of a stacking element 750 in accordance with the present disclosure, the stacking element 750 being receivable in the corresponding recess of one or more of the mounting brackets, housing modules, and/or lids of the present disclosure. The stacking element 750 will be discussed in greater detail below.

FIGS. 46-49 illustrate an example assembling of a stack of housing modules in accordance with present disclosure using a plurality of the housing modules 600 of FIGS. 35A and 36, lids 700 from FIG. 41, one of the mounting bracket 730 of FIG. 44, and a plurality of the stacking elements 750 of FIG. 45. In addition, the housing module 600 that is mounted to the bracket 730 includes a further example of a lid 760. The lid 760 is identical to the lid 710 of FIG. 42A, but has a different port structure on the front side, in that the lid 760 has a single opening at the front side that is covered by the cover 502a with its four ports. The rear side of the lid 760 includes a cable seal 510 supported in a port for receiving an input cable. Edges of the lid 760 can be secured to the module housing 600 with fasteners 690.

Figure 49:
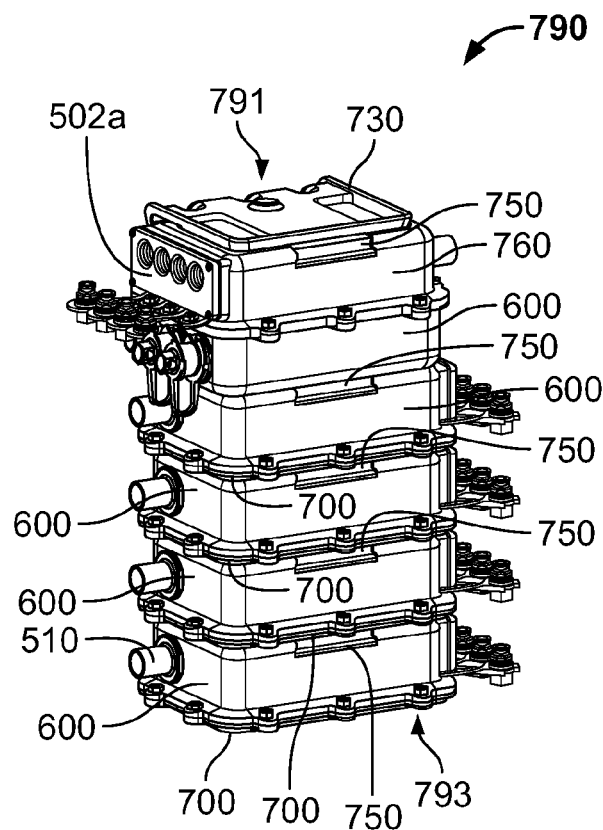
FIG. 49 depicts a further stage of the stacking of FIGS. 46-48.

Still referring to FIGS. 46-49, to construct the stack 790 having a bottom 791 and a top 793, a lid 760 is secured to a first module housing 600 using one of the stacking elements 750, which engages a recess 762 in the lid 760 and also the recess 736 in the bracket 730. Additional housing modules 600, covered with lids 700, are coupled together in the stack using an additional stacking element 750 between each pair of adjacent housing modules 600 until the stack of five lidded housing modules 600, shown in FIG. 49, is completed. It should be noted that the housing module 600 that is coupled (via the lid 760) to the bracket 730 is upside down relative to the other housing modules 600 in the stack. Thus, the stacking element recesses of the two housing modules 600 closest to the bracket 730 are juxtaposed and aligned such that a single stacking element 750 can couple those two housing modules together.

Figure 50:
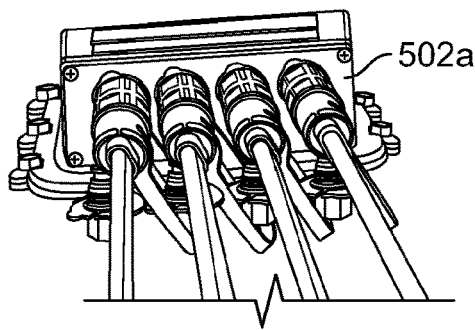
FIG. 50 shows an example stacking configuration of a housing module and other elements of FIGS. 46-49.
Figure 51:
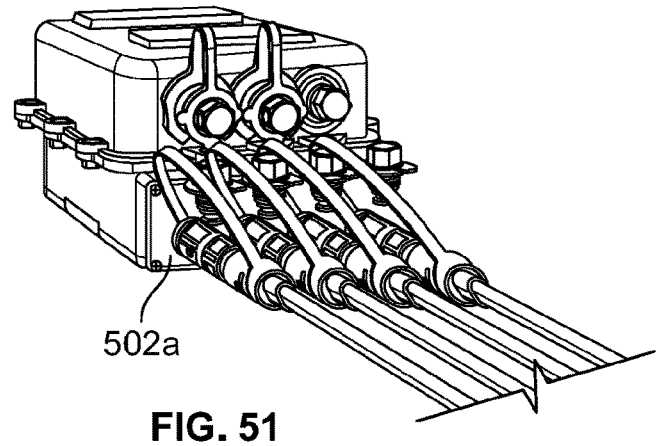
FIG. 51 shows a further example stacking configuration of a housing module and other elements of FIGS. 46-49.
Figure 52:
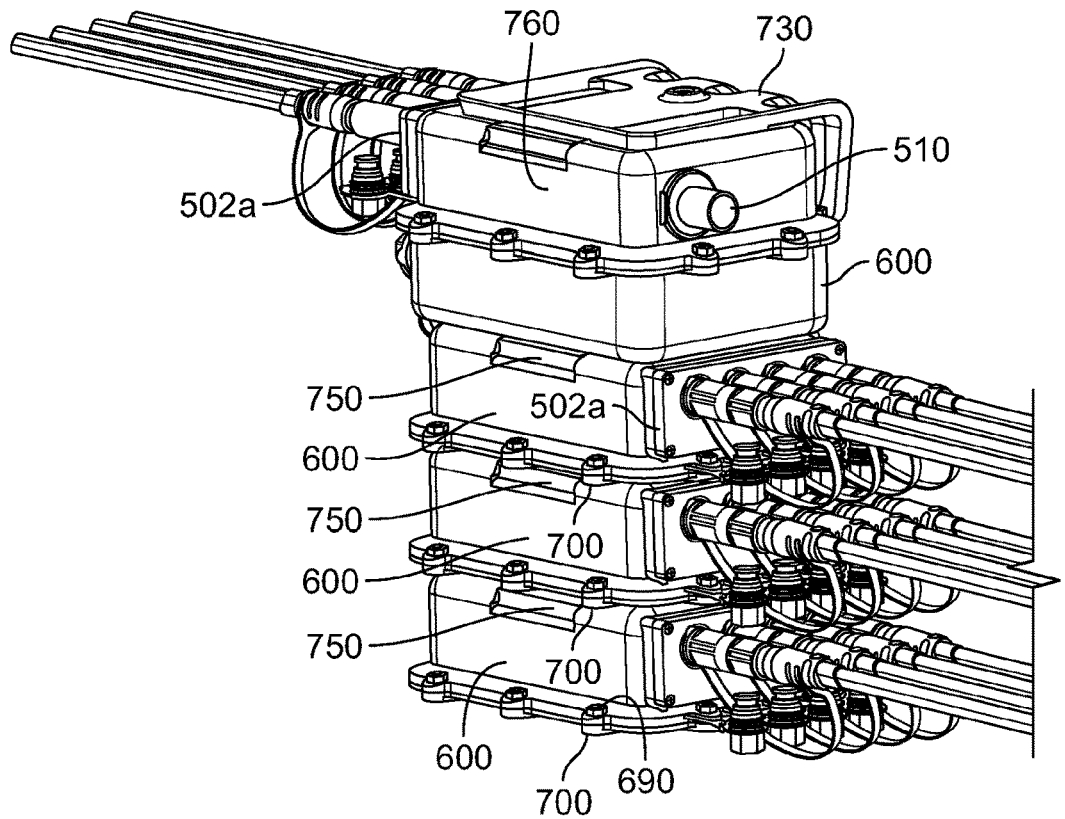
FIG. 52 shows a further example stacking configuration of housing modules and other elements of FIGS. 46-49.

FIGS. 50-52 show additional views of various example stacking configurations of the housing modules and other elements of FIGS. 46-49. In FIGS. 50-52, some of the ports of the housing modules 600 and the lid 760 are shown in a connectorized configuration (i.e., with cables feeding into those ports and terminating at connectorization elements supported in those ports).

Figure 53:
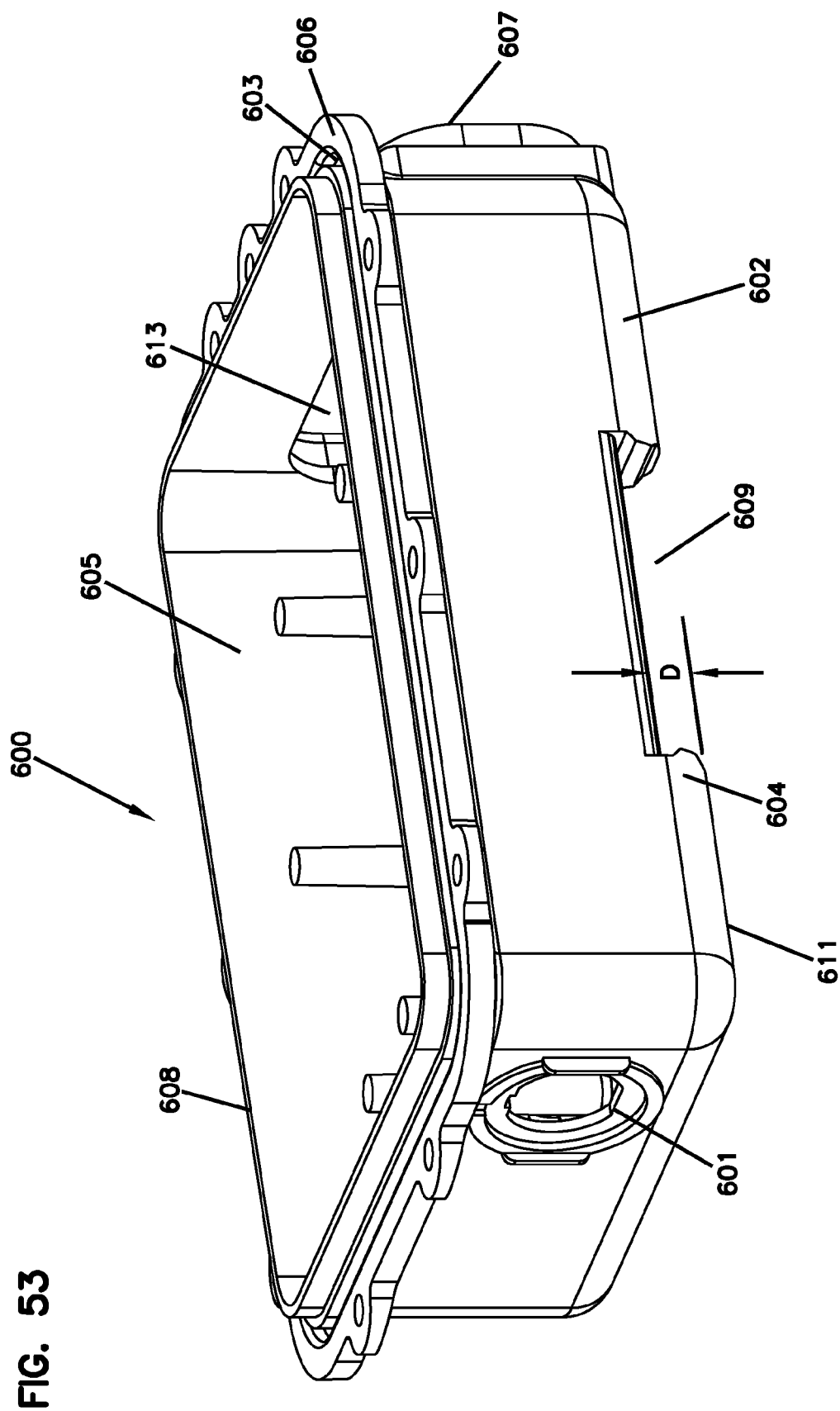
FIG. 53 is an enlarged top, rear, perspective view of the housing module of FIG. 36.
Figure 54:
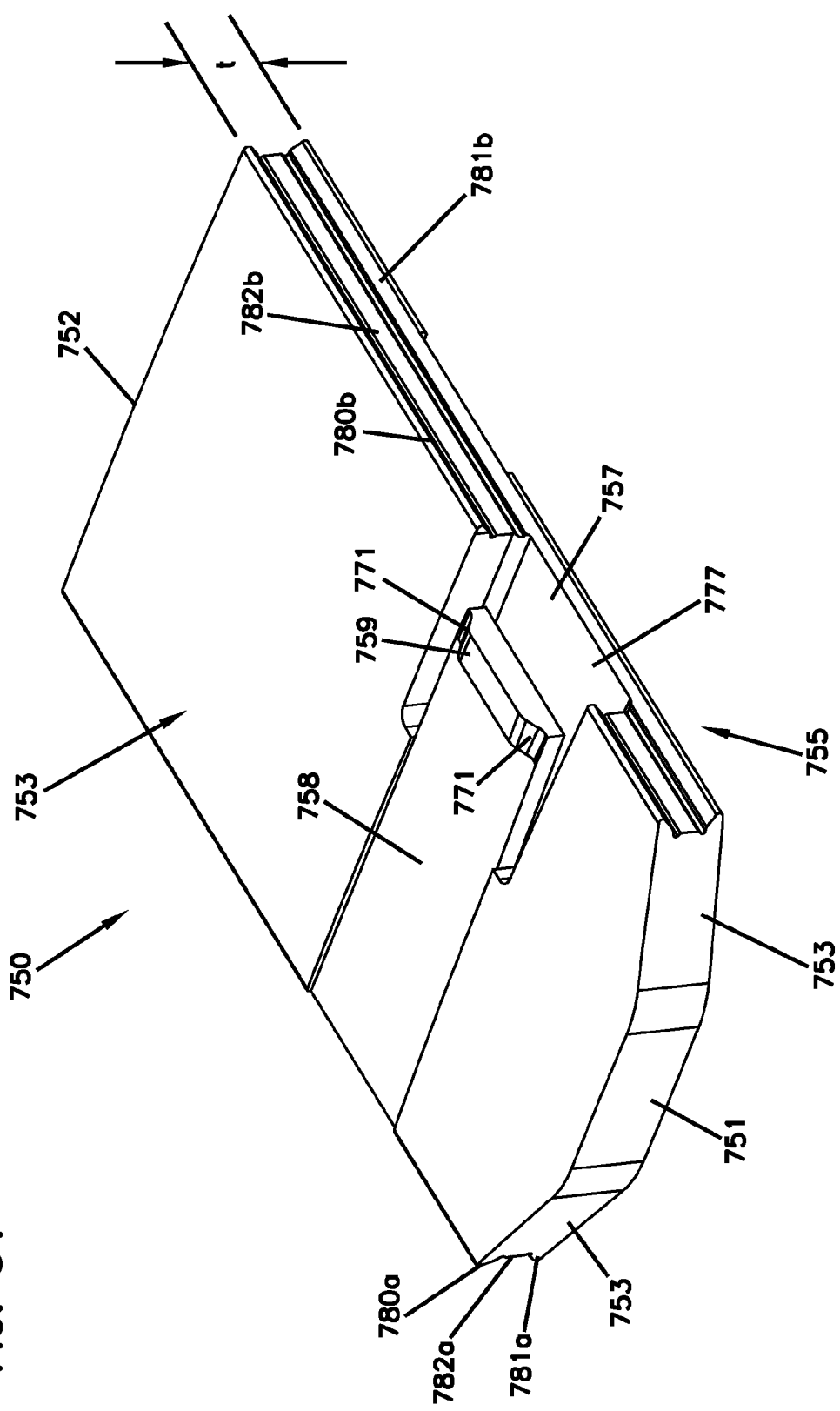
FIG. 54 is an enlarged perspective view of the stacking element of FIG. 45.
Figure 55:
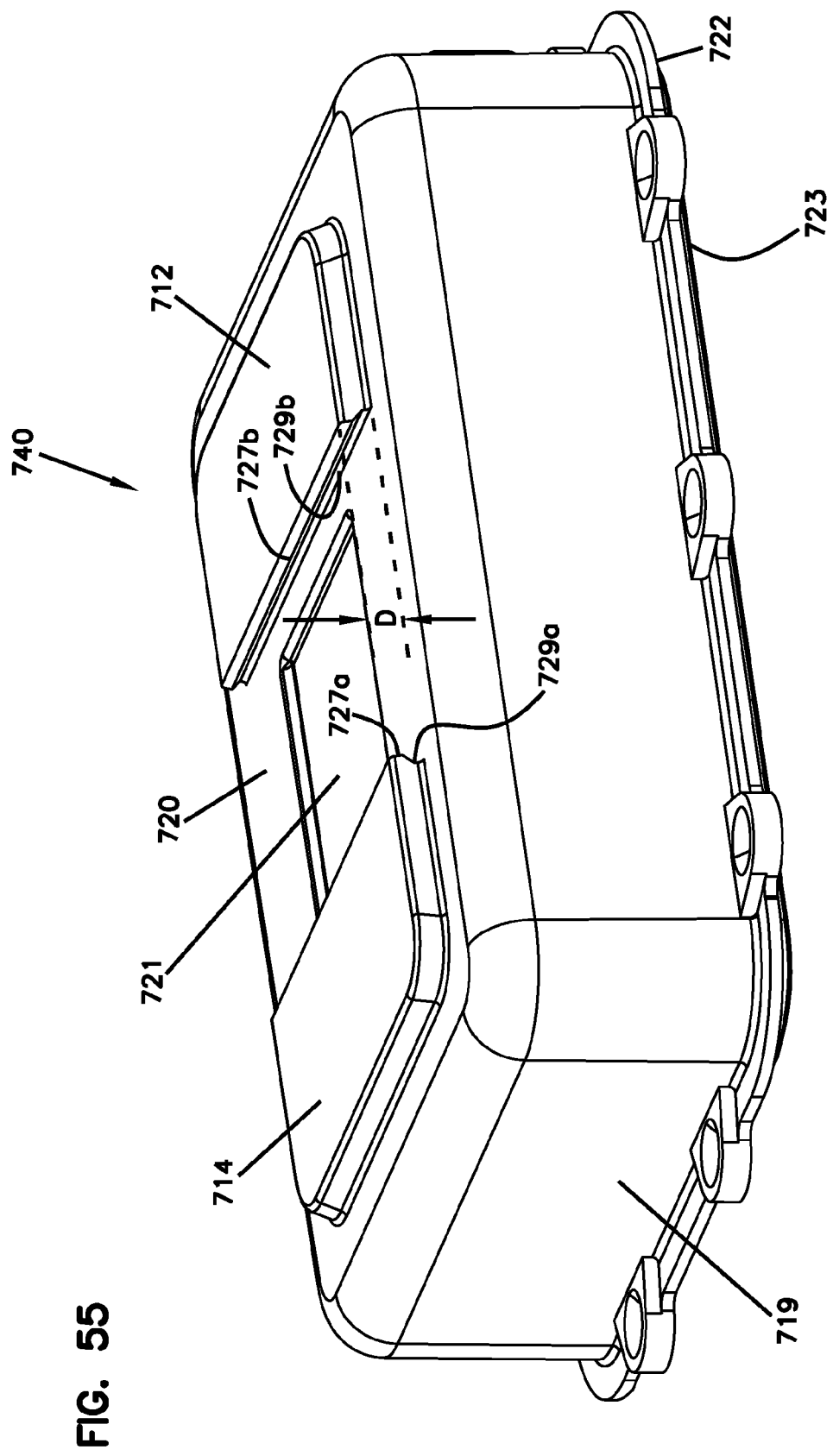
FIG. 55 is an enlarged top, rear, perspective view of the lid of FIG. 43.
Figure 56:
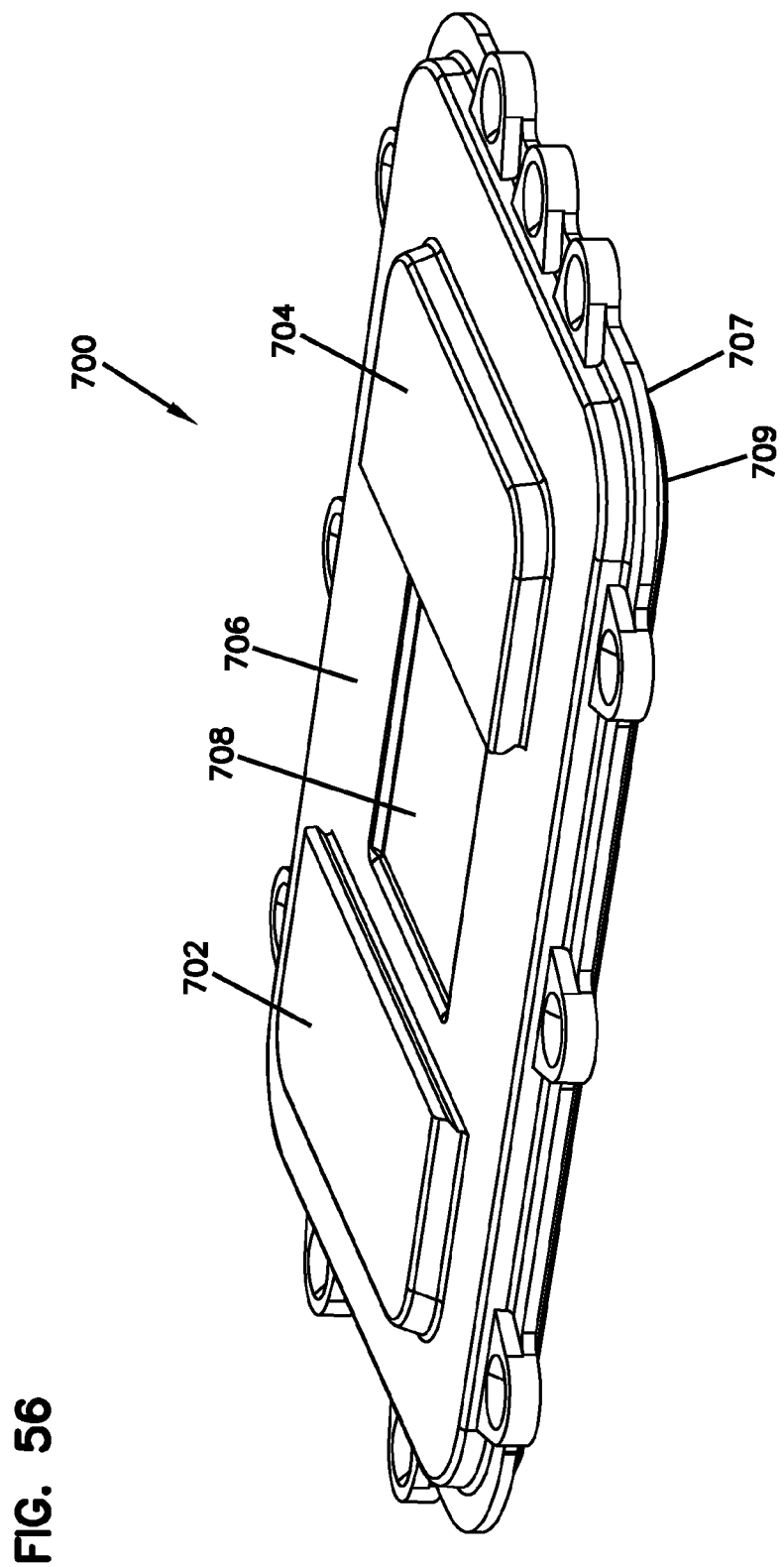
FIG. 56 is an enlarged, top perspective view of the lid of FIG. 41.

FIG. 53 is an enlarged top, rear, perspective view of the housing module 600 of FIG. 36. FIG. 54 is an enlarged perspective view of the stacking element 750 of FIG. 45. FIG. 55 is an enlarged top, rear, perspective view of the lid 740 of FIG. 43. FIG. 56 is an enlarged, top perspective view of the lid 700 of FIG. 41.

Referring to FIGS. 53-56, the housing module 600 includes in opening 613 at the front 607. The opening 613 can be covered with an appropriately sized cover having a desired configuration of ports or no ports at all. For example, the opening 613 can be covered with the cover 502a. The port 601 at the back of the housing module 600 is configured to receive a hardened fiber optic connector or adapter of a particular form factor, but can be adapted differently, e.g., by fitting a cable seal 510 about the port 601 and running the fibers of cable through the cable seal into the interior volume 605 without termination.

A rim 606 around the interior volume 605 of the housing module 600 can be adapted to abut a corresponding component of a lid (e.g., the rim 722 of the lid 740, or the rim 707 of the lid 700) when such a lid covers the open top 608. A groove 603 about the perimeter of the module 600 and within the rim 606 can provide additional engagement or sealing capability between the housing module 600 and a lid, as a complementary gasket or rib (such as the rib 723 of the lid 740 or the rib 709 of the lid 700) can mate with the groove 603 for improved engagement between module and lid.

The recess 609 is structurally identical to the recess 720 and the recess 706, and so the following discussion regarding the recess equivalently applies to each of the module housing 600, the lid 740, and the lid 700. The recess (609, 706, 720) is disposed between two shoulders (602 and 604; 702 and 704; 712 and 714). Within the recess is a depression (708, 721). The depth D of the recess (609, 706, 720) is approximately one half the thickness t of the stacking element designed to be received by the recess, such as the stacking element 750. Thus, the stacking element can nest between two components of the stack (such as, between a housing module and a lid, between a lid and a bracket, between a housing module and a bracket, between two lids, between two housing modules, etc.) and those two components can still abut or nearly abut each other. That is, the recesses and the stacking elements can be coordinated in size such that the stacking elements do not add to an overall height of the stack, "height" being defined along the direction of stacking modules.

Each stacking element is equipped with one or more features adapted to mate with two components of a module stack at the same time. With respect to the specific example of a stacking element 750, that stacking element includes an insertion end 751 opposite a back end 752. Optionally, the insertion end 751 includes one or more bevels 753 to assist in aligning and guiding the stacking element 750 into the recess of the stack component. The shape of the front 751 can also be configured to nest in a correspondingly shaped area of the recess to help prevent lateral movement of the stacking element once installed.

The stacking element 750 also includes a top 753, a bottom 755 and two opposing sides. One or both of the top and the bottom can be provided with a locking element that locks that stacking element 750 to the component of the stack when properly installed. In the stacking element 750, one or both of the top and bottom includes a cantilevered arm 758 with a protruding end 759. As the stacking element 750 is slid into position within a recess of a component of a stack, the protruding end 759, which can have beveled corners 771, is pushed down into the cutout 757 against the biasing force of the cantilever arm 758. The beveled corners 771 can prevent the protruding end 759 from catching against the recess during the installation process. Once the protruding end 759 is vertically aligned with the depression (708, 721, or an equivalent depression in the recess 609, e.g.), the biasing force of the cantilever arm causes it to snap into the depression, effectively horizontally locking the stacking element to the component of the stack.

When disassembling the stack, a finger or tool can be inserted into the cutout 757 via the opening 777 to push the protruding end 759 into the cutout 757 such that the stacking element 750 can be removed from the stack.

The stacking element can also include a stabilizing feature for the vertical direction, i.e., to help prevent vertical movement of the stacking element in the stack. Thus, for example, the stacking element 750, on its two sides, includes a system of at least one groove (782a, 782b), each flanked by a par of ribs (780a and 780b; and 781a and 781b). The ribs and grooves are configured to nest with complementary features on the adjacent two components of the stack when the stacking element is installed. Thus, for example, the ribs 727a and 727b of the shoulders (714, 712) of the lid 740 can nest in a portion of the grooves (782a, 782b); while the ribs 781a and 781b can nest in the grooves (729a, 729b). Meanwhile, the ribs 780a and 780b can nest in a complementary groove of a second component of the stack, while the ribs of the second component of the stack can nest in another portion of the groove (782, 782b) that is not occupied by the ribs of the first component of the stack.

In some stack examples, once the stacking element 750 is properly installed and coupling adjacent components (module sides, module lids, bracket) of the stack together, the shoulders or other portions of the components can abut or nearly abut each other, thus minimizing the overall height of the stack.

It should be appreciated that the geometrically complementary rib and grooves structures of the shoulders of the component of the stack and the stacking element can facilitate guiding and proper positioning of the stacking element within the recess of that component.

Figure 57:
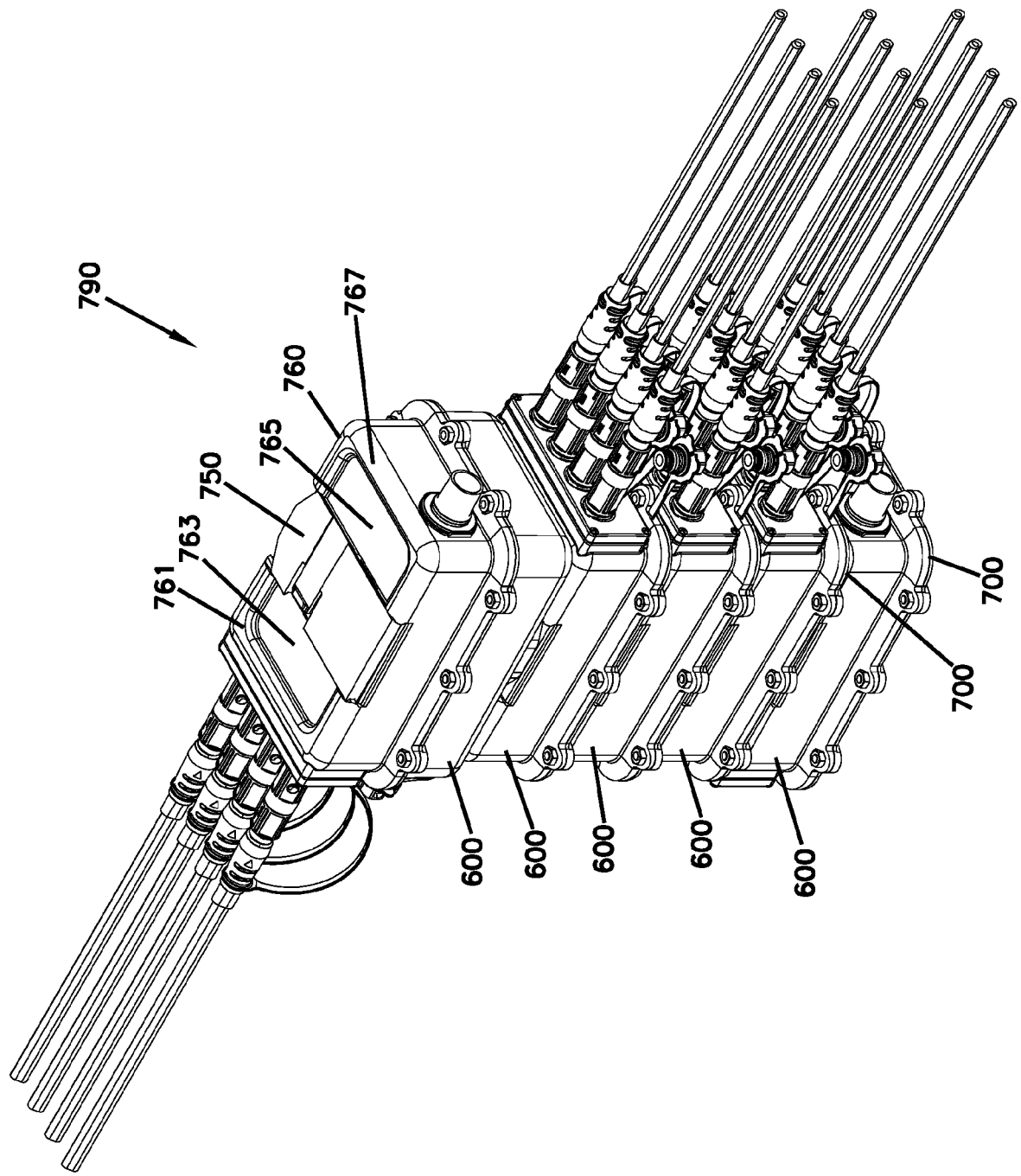
FIG. 57 illustrates a further configuration of the example stack of FIG. 49.

FIG. 57 illustrates a further configuration of the example stack 790 of FIG. 49. Referring to FIG. 57, the bracket is not shown in order to more clearly show the engagement between the stacking element 750 and the particular embodiment of the lid 760. The bottom 761 of the lid 760 is configured to abut the bracket 730. As shown, the shoulder structure (consisting of the shoulders 763 and 765) of the lid 760 differs from that of, e.g., the lid 700. A raised rim 767 partially surrounds the shoulders 763 and 765, and a corresponding portion of the leg of the bracket 730 abuts the rim 767 when the lid 760 is coupled to the bracket 730.

Figure 58:
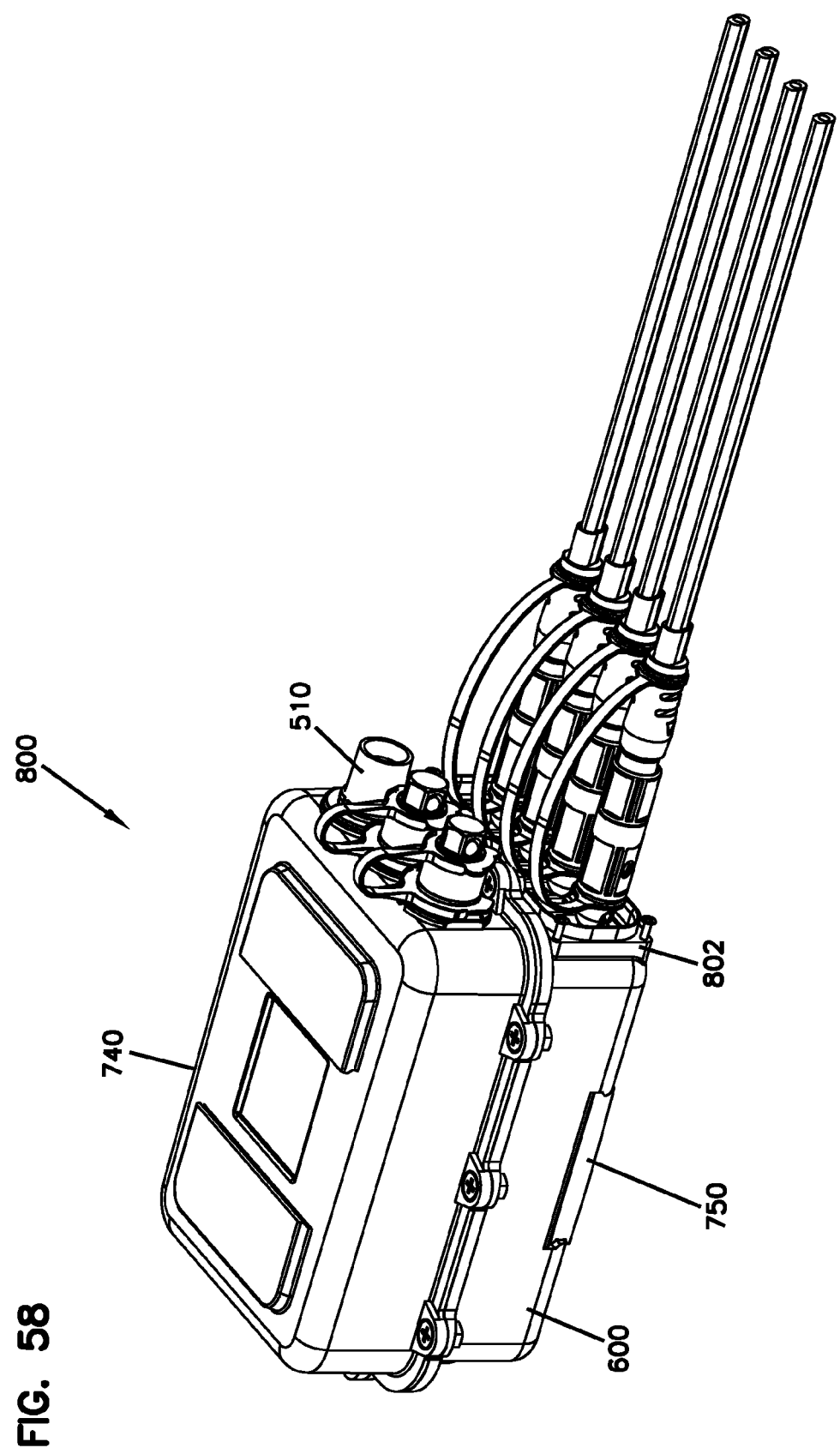
FIG. 58 is a perspective view of an example single, enclosed, partially connectorized module in accordance with the present disclosure.

FIG. 58 is a perspective view of a single, enclosed, partially connectorized module 800, including the housing 600 covered by the lid 740. One of the ports to the lid 740 has been fitted with a cable seal 510 adapted to receive a non-connectorized portion of a cable, the other two ports in the lid 740 being plugged. The front opening 613 of the housing 600 is fitted with a cover 802 having four ports adapted to receive connectorizing elements. A stacking element 750 is also shown installed in the recess 609 of the housing 600.

Figure 59:
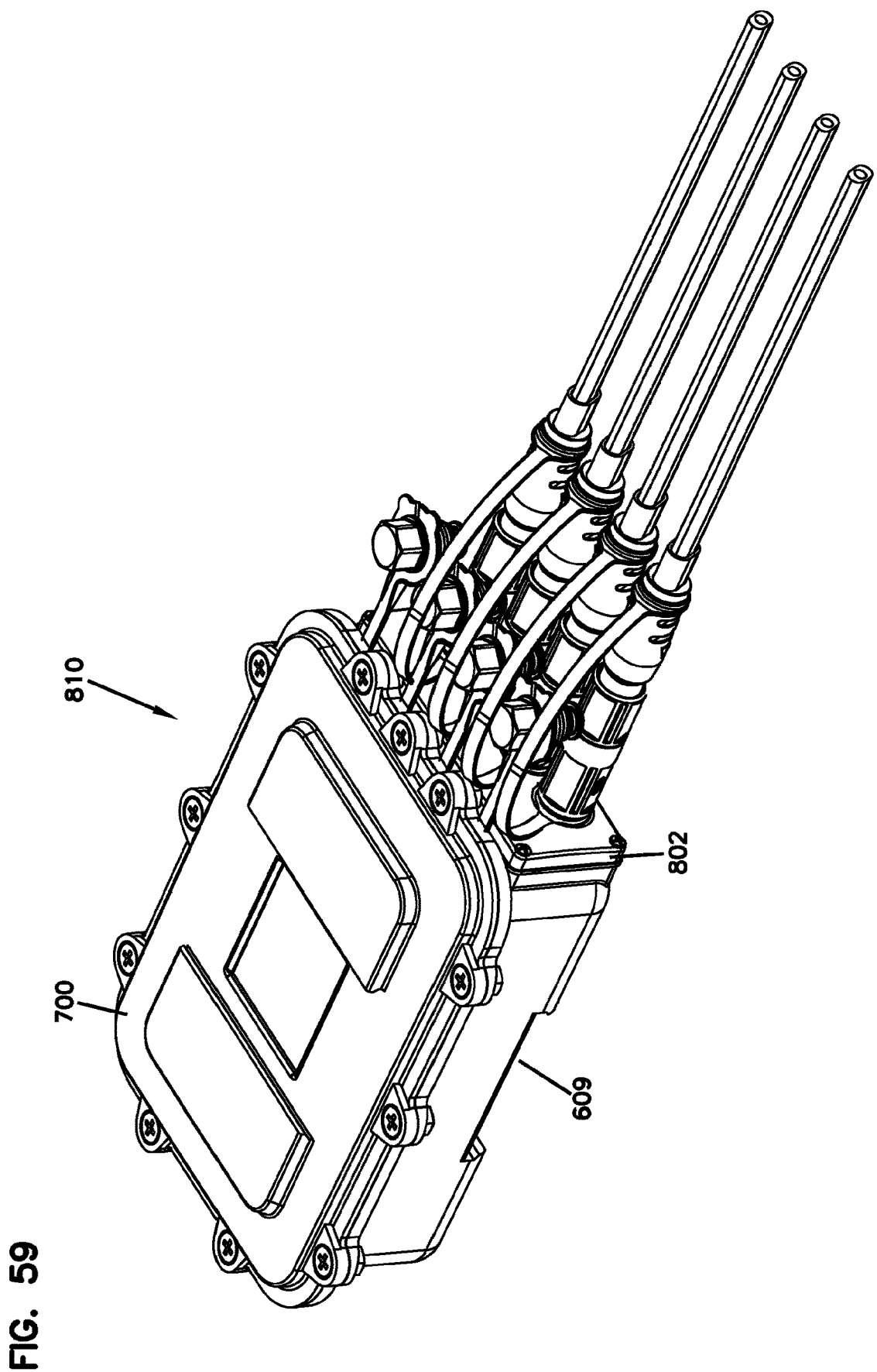
FIG. 59 is a perspective view of a further example of a single, enclosed, partially connectorized module in accordance with the present disclosure.

FIG. 59 is a perspective view of a further single, enclosed, partially connectorized module 810, including the housing 600 covered by the lid 700. The front opening 613 of the housing 600 is fitted with a cover 802 having four ports adapted to receive connectorizing elements. A stacking element is not shown.

Figure 60B:
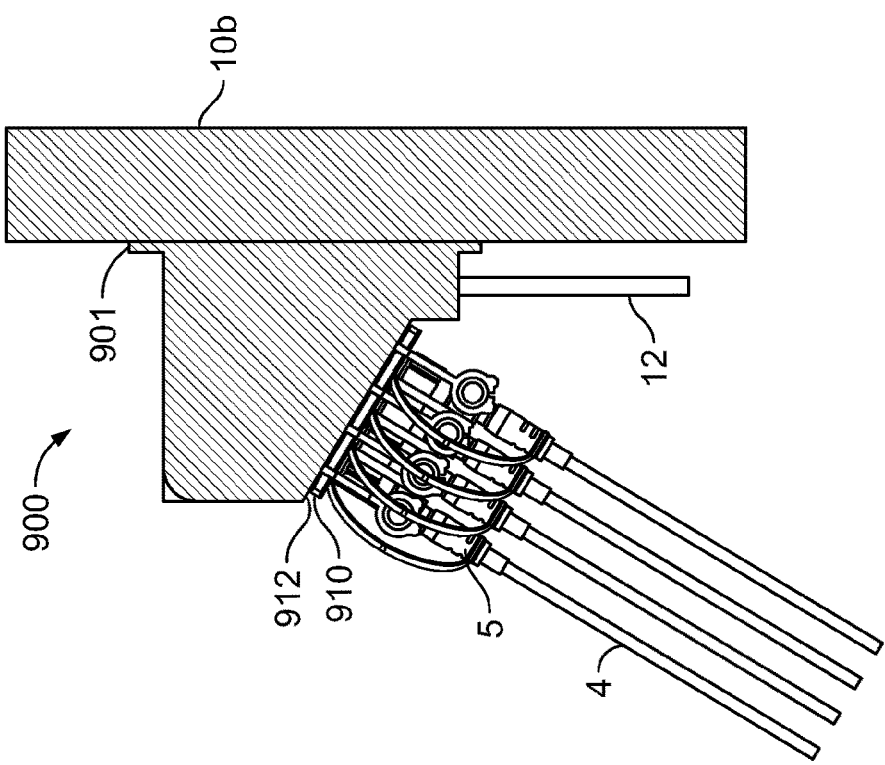
FIG. 60B illustrates the stackable enclosure module of FIG. 60A mounted to a vertical surface.
Figure 60A:
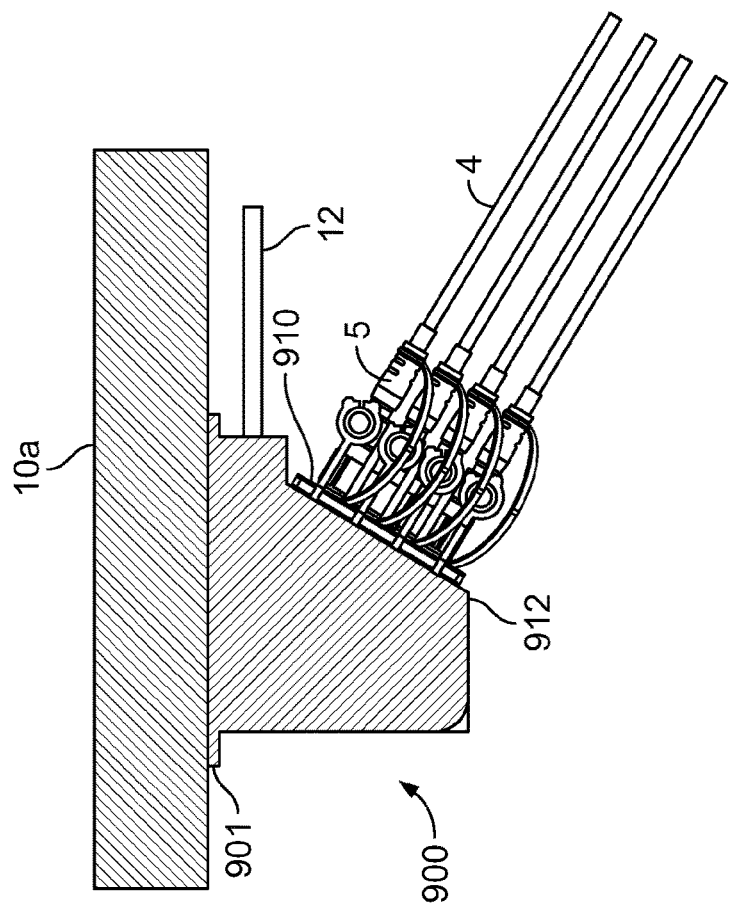
FIG. 60A illustrates a further embodiment of a stackable enclosure module in accordance with the present disclosure mounted to a horizontal surface.

FIG. 60A illustrates a further embodiment of a stackable enclosure module 900 in accordance with the present disclosure mounted to a horizontal surface 10a. FIG. 60B illustrates the stackable enclosure module 900 of FIG. 60B mounted to a vertical surface 10b.

Referring to FIGS. 60A-60B, a side 901 of the module 900 is optionally mounted to the structure 10a or 10b. A feeder cable 12 enters the interior volume defined by the module 900 approximately parallel to the side 901. A cover 910 with four ports covers an opening of another side 912 of the module 900. Connectors 5 terminating drop cables 4 are supported by the ports of the cover 910. The side 912 is at an oblique angle relative to the structure mounting side 901, which can facilitate access to the cables interfacing with the module 900.

Figure 61:
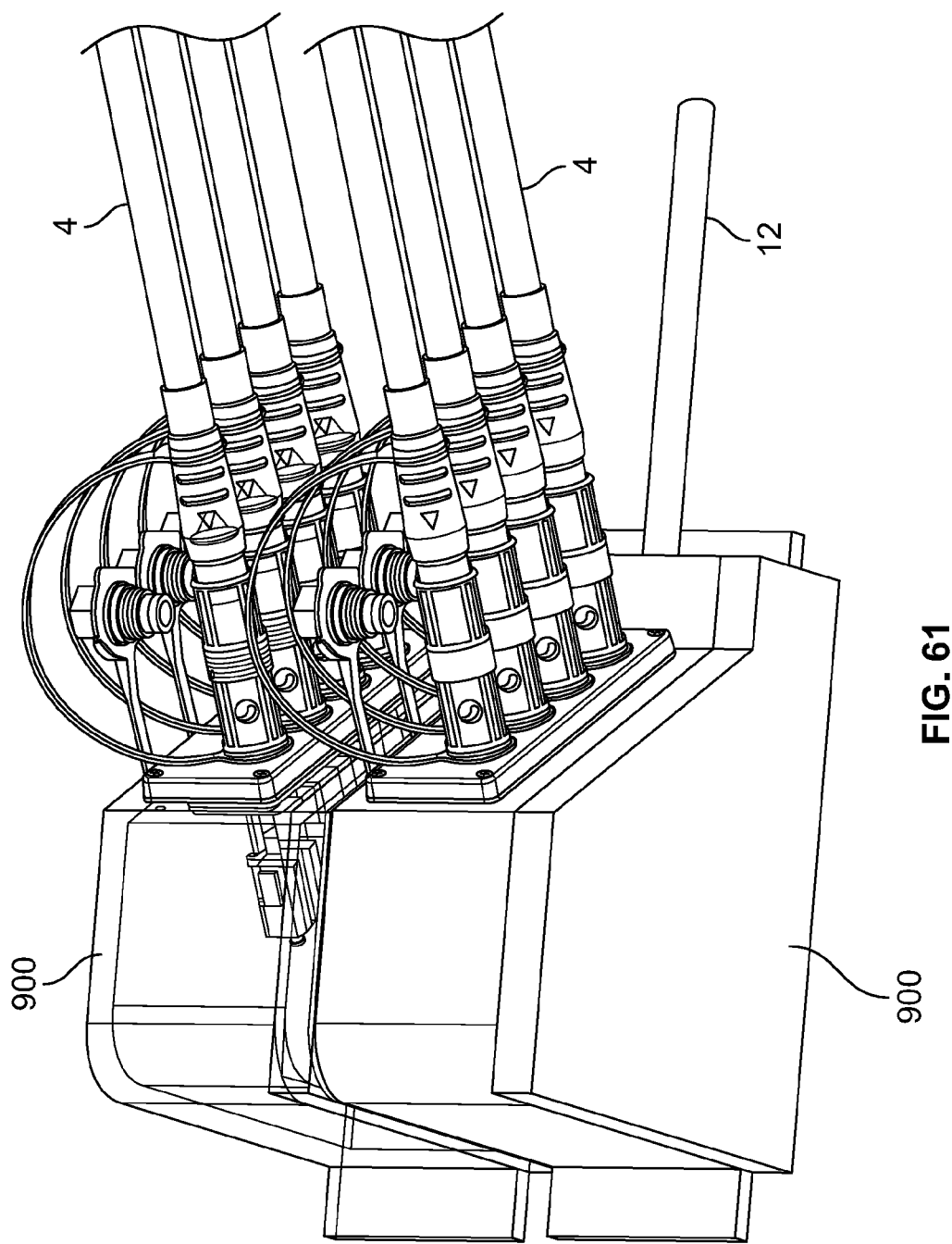
FIG. 61 shows a stacked configuration of a plurality of the telecommunications modules of FIGS. 60A-60B mounted to a structure, one of the modules being shown as partially transparent to assist in viewing.

FIG. 61 shows a stacked configuration of a plurality of the telecommunications modules 900 of FIGS. 60A-60B mounted to a structure, one of the modules being shown as partially transparent to assist in viewing. A stacking element can be placed between the two modules 900 and additional adjacent pairs of such modules to build a stack of such modules. The modules 900 can be configured to receive the same or different configuration of stacking element as one or more other configurations of modules.

Figure 62:
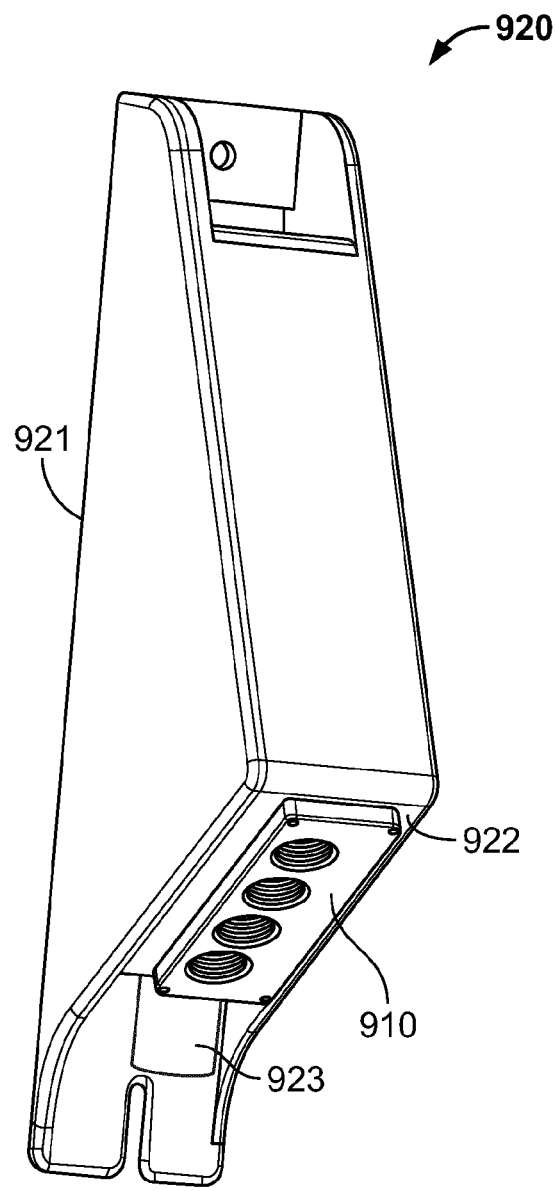
FIG. 62 is a perspective view of a further example telecommunications module in accordance with the present disclosure.
Figure 63A:
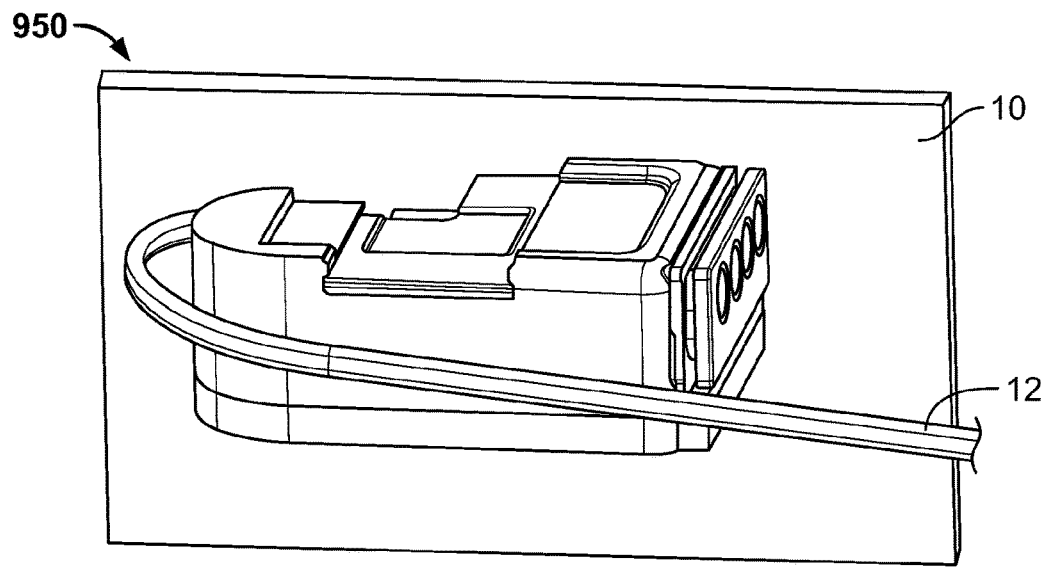
FIGS. 63A-63D show various views of a further example telecommunications module in accordance with the present disclosure, mounted to a structure.
Figure 63B:
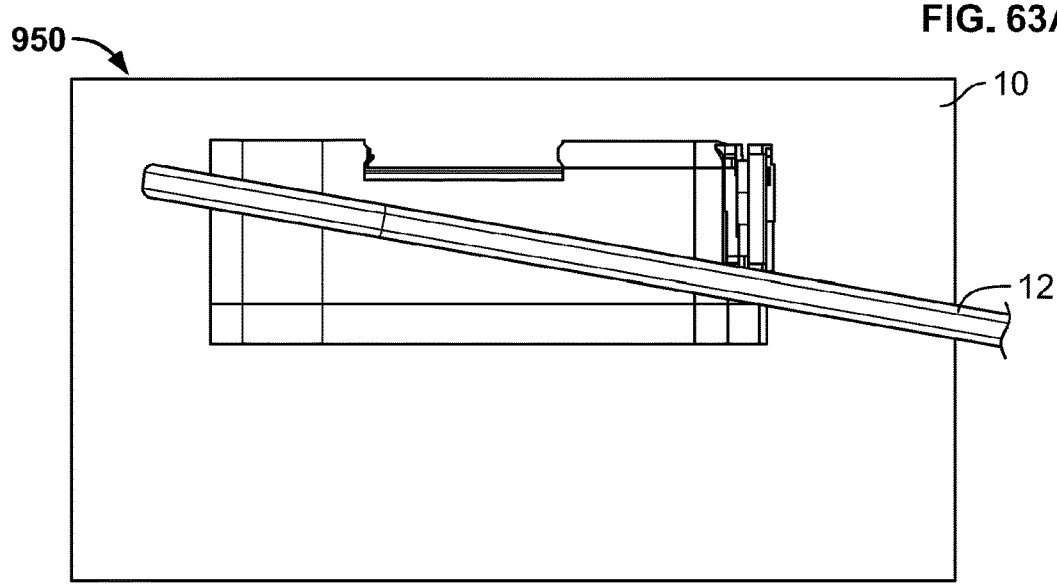
Figure 63C:
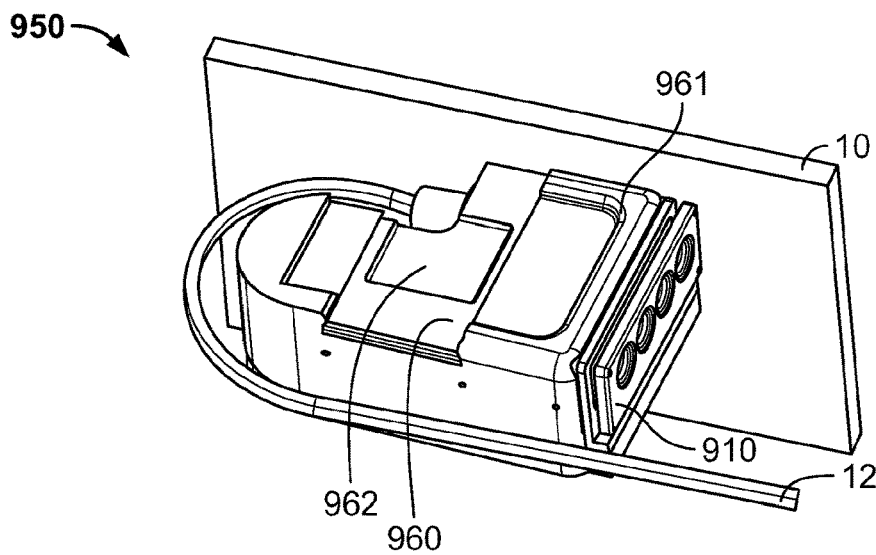
Figure 63D:
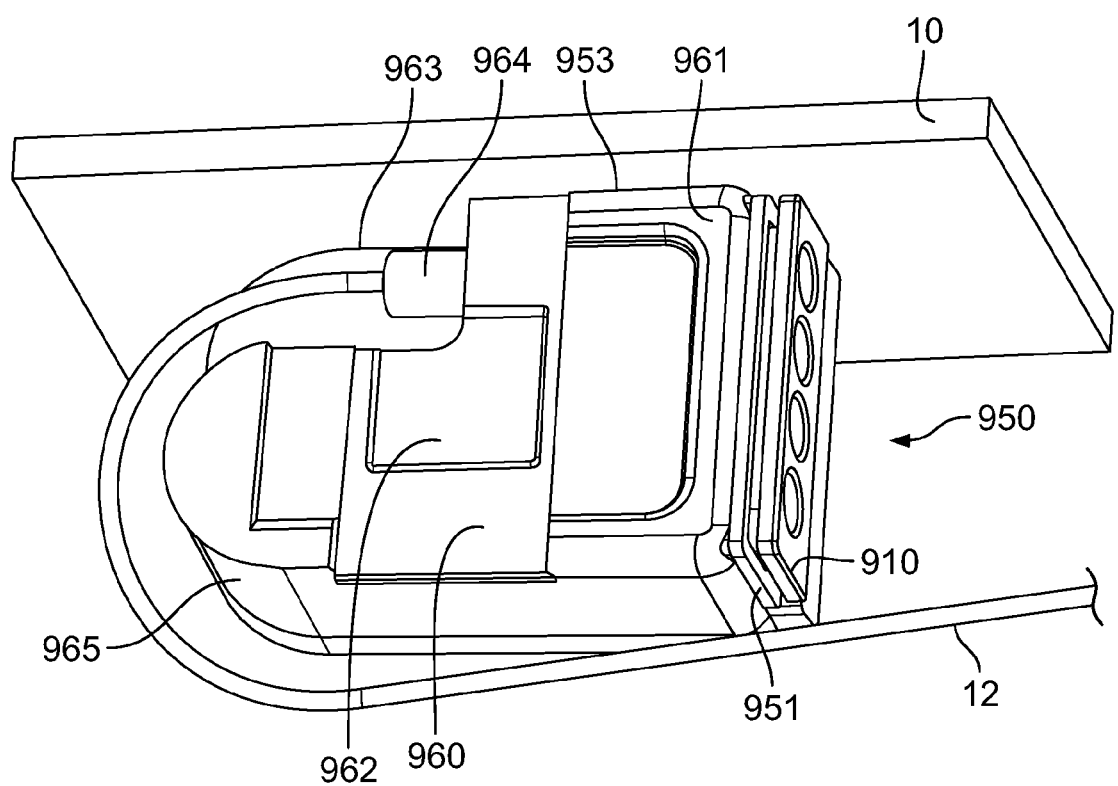

FIG. 62 is a perspective view of a further example telecommunications module 920 in accordance with the present disclosure that can be made stackable with additional modules. The module 920 includes a side 921 adapted to optionally mount the module to a structure. Another side 922 includes a coverable opening that is shown covered by the cover 910. The side 922 is oblique to the side 921. A further port 923 can be adapted to sealingly receive a non-connectorized portion of a cable (e.g., a drop cable) entering the interior volume defined with the module 920.

FIGS. 63A-63D show various views of a further example telecommunications module 950 in accordance with the present disclosure, mounted to a structure 10. Referring to FIGS. 63A-63D, the module 950 includes a side 953 adapted to optionally mount the module 950 to the structure 10. The bottom 951 of the module 950 has an opening covered by the cover 910 having four ports adapted to receive fiber connectorizing elements. The module 950 has a side 961. A cable guiding channel 963 is formed on the side 961. In the cable guiding channel 963 is disposed a cable port 964 adapted to sealingly receive a non-connectorized portion of a cable 12 entering the interior volume defined by the module 950.

The cable 12 extends through the cable guiding channel 963 and can be routed from the top of the module towards the bottom of the module 950 by curving it around a curved top side 965 the module 950.

A recess 960 is formed in the side 961. The recess 960 is configured to receive a stacking element, such as the stacking element 750 described above and, in that manner, a stack of a plurality of modules can be assembled that includes one or more of the module 950. A depression 962 in the recess 960 can receive a cantilever arm protrusion of a stacking element in the manner described above. In the example module 950 shown, the recess 960 lies above the cable port 964, such that the routing of the cable 12 into the module 950 via the channel 963 is not interrupted by a stacking element installed in the recess 960.

EXAMPLE EMBODIMENTS

According to a 1st embodiment in accordance with the present disclosure is provided a telecommunications enclosure system comprising: a plurality of housing modules, each of the housing modules defining an interior volume and comprising a top face, a bottom face, and a plurality of sides extending between the top face and the bottom face, at least one of the sides including a port for accessing the interior volume, at least of the top face and the bottom face comprising a groove; and at least one stacking element positionable between the top face of a first of the housing modules and the bottom face of a second of the housing modules and in the groove of the top face of the first housing module and in the groove of the bottom face of the second housing module; wherein each of the modules has a maximum height between the top face and the bottom face; and wherein for a stack of N of the modules coupled together by N−1 of the stacking elements, N being an integer greater than 1, the stack has a total maximum height that is equivalent to a sum of the heights of the N modules.

According a 2nd embodiment is provided the 1st embodiment, wherein for at least one of the housing modules, the housing module comprises a lid for covering an opening to the interior volume, and wherein the lid comprises the top face or the bottom face and the groove of the top face or the bottom face.

According to a 3rd embodiment is provided the 1st or the 2nd embodiment, wherein for each pair of adjacent housing modules, the top face of one of the housing modules in the pair abuts the bottom face of the other of the housing modules in the pair when one of the at least one stacking element is positioned therebetween.

According to a 4th embodiment is provided any of the 1st through 3rd embodiments, further comprising a mounting bracket, the mounting bracket comprising a mounting portion configured to mount a stack of the housing modules to a structure, the mounting bracket further comprising a module engaging surface, the module engaging surface comprising a groove adapted to receive a portion of the at least one stacking element.

According to a 5th embodiment is provided the 2nd embodiment, wherein the lid comprises a plurality of walls defining an interior expansion volume, and wherein when the lid is coupled to the housing module, the interior volume of the housing module is expanded according to the expansion volume.

According to a 6th embodiment is provided any of the 1st through 5th embodiments, wherein at least one of the modules comprises a port for feeding a cable into the interior volume on each of two of the sides, the two sides opposing each other.

According to a 7th embodiment is provided a telecommunications module adapted to be secured to a structure, comprising: a module housing including a first side adapted to face toward the structure when the module is secured to the structure; and a second side having an opening and supporting a cover having a plurality of fiber optic connector ports, the second side being oriented obliquely to the first side.

According to an 8th embodiment is provided the 7th embodiment, wherein the fiber optic connector ports are environmentally sealed relative to the module housing, and/or are configured to form environmental seals relative to the fiber optic connectors when fiber optic connectors are inserted within the fiber optic connector ports, and/or include threads for mating with corresponding threads of the fiber optic connectors, and/or include bayonet interfaces for mating with corresponding bayonet interfaces of the fiber optic connectors.

According to a 9th embodiment is provided the 7th or 8th embodiment, wherein the cover of the module housing defines a single row of fiber optic connector ports.

According to a 10th embodiment is provided any of the 7th through 9th embodiments, wherein a bottom side of the module has a bottom width that extends between left and right sides of the module housing, wherein the module housing defines a module width between the left and right sides, wherein the connector ports define port diameters, and wherein the module width is no more than at least 2, 3, 4, 5, 6, 7, 8, 9 or 10 times the port diameters.

According to an 11th embodiment is provided the 10th embodiment, wherein a reference line on which the connector ports are aligned is perpendicular to the bottom width.

According to a 12th embodiment is provided the 10th or 11th embodiment, wherein the left and right sides are parallel and planar.

According to a 13th embodiment is provided any of the 7th through 12th embodiments, wherein the fiber optic connector ports include internal fiber optic adapters.

According to a 14th embodiment is provided a telecommunications module adapted to be secured to a structure such as a wall, pole or other surface, comprising: a module housing including a back side adapted to face toward the structure when the module is secured to the structure; a bottom side defining a plurality of fiber optic connector ports, the fiber optic connector ports adapted for receiving fiber optic connectors; and a top side defining a cable entrance location and also including a curved cable guide for providing bend radius protection to a cable and for transitioning a cable from an upwardly extending orientation to a downwardly extending orientation, wherein in use the cable is routed upwardly from the cable entrance location, over the curved cable guide and then downwardly.

According to a 15th embodiment is provided the 14th embodiment, wherein the curved cable guide extends higher than the cable entrance location, and wherein the module housing defines a rear pocket corresponding to the cable entrance location.

According to a 16th embodiment is provided the 14th or 15th embodiment, wherein the cable entrance location is positioned between the cable guide and the back side of the module housing, and wherein the curved cable guide is configured to transition the cable from the cable entrance location to a front side of the module housing.

According to a 17th embodiment is provided any of the 14th through 16th embodiments, wherein the fiber optic connector ports are environmentally sealed relative to the module housing, and/or are configured to form environmental seals relative to the fiber optic connectors when the fiber optic connectors are inserted within the fiber optic connector ports, and/or include threads for mating with corresponding threads of the fiber optic connectors, and/or include bayonet interfaces for mating with corresponding bayonet interfaces of the fiber optic connectors.

According to an 18th embodiment is provided any of the 14th through 17th embodiments, wherein the module housing defines a row of fiber optic connector ports at the bottom side, the row optionally being a single row.

According to a 19th embodiment is provided any of the 14th through 18th embodiments, wherein the bottom side has a bottom width that extends between left and right sides of the module housing, wherein the module housing defines a module width between the left and right sides, wherein the connector ports define port diameters, and wherein the module width is no more than at least 2, 3, 4, 5, 6, 7, 8, 9 or 10 times the port diameters.

According to a 20th embodiment is provided any of the 14th through 19th embodiments, wherein the fiber optic connector ports include internal fiber optic adapters.

From the foregoing detailed description, it will be evident that modifications and variations can be made in the devices of the disclosure without departing from the spirit or scope of the invention.

What is claimed is:

1. A telecommunications enclosure system, comprising:
   a plurality of housing modules, each of the housing modules defining an interior volume configured to manage optical fibers; and
   at least one stacking element configured to be positioned between a first of the housing modules and a second of the housing modules to align the at least one stacking element with the interior volumes of the first and second housing modules and stack, along a stacking direction, a stack of the housing modules coupled together by the at least one stacking element, such that a first portion of the at least one stacking element is received by the first housing module and a second portion of the stacking element is received by the second housing module,
   wherein the housing modules and the at least one stacking element are configured such that, when the housing modules are coupled together by the at least one stacking element in the stack, a height of the at least one stacking element along the stacking direction does not increase a height of the stack along the stacking direction.

2. The system of claim 1, comprising N of the housing modules and N−1 of the stacking elements, wherein N is a positive integer greater than two, and wherein there is one stacking element positionable between each pair of adjacent housing modules.

3. The system as in claim 1, wherein for at least one of the housing modules, the housing module includes a lid for covering an opening to the interior volume, and wherein the lid is adapted to receive a portion of one of the at least one stacking element.

4. The system as in claim 1, wherein for each pair of a first and a second housing module that are adjacent to each other, a portion of the first housing module in the pair abuts a portion of the second housing module in the pair when the housing modules are coupled together by the at least one stacking element in the stack.

5. The system as in claim 1, further comprising a mounting bracket, the mounting bracket comprising a mounting portion configured to mount the stack of the housing modules to a structure, the mounting bracket further comprising a module engaging surface, the module engaging surface adapted to receive a portion of the at least one stacking element.

6. The system as in claim 3, wherein the lid comprises a plurality of walls defining an interior expansion volume, and wherein when the lid is coupled to the at least one of the housing modules, the interior volume of the housing module is expanded according to the expansion volume.

7. The system as in claim 1, wherein at least one of the housing modules comprises a cable port.

8. The system as in claim 1, wherein an opening of at least one of the housing modules is covered with a cover defining at least one port configured to receive a fiber optic connector.

9. The system as in claim 1, wherein at least one of the housing modules comprises an input port configured to receive a non-connectorized portion of a fiber optic cable and an output port configured to receive a non-connectorized portion of a fiber optic cable.

10. A stacking element for stacking a plurality of telecommunications modules together, the stacking element comprising: a top, a bottom, and each of a front, a back and two sides extending between the top and the bottom, at least one of the top and bottom including a cutout and a cantilevered arm, at least a portion of the cantilevered arm being disposable in the cutout, each of the sides including a pair of ribs and a groove between the pair of ribs, wherein a first of each of the pairs of ribs is nestable in one of a first and a second groove of a first of the telecommunications modules while a second of each of the pairs of ribs is nestable in one of a first and a second groove of a second of the telecommunications modules.

11. The stacking element as in claim 10, wherein the front includes at least one beveled corner.

12. The stacking element as in claim 10, wherein a free end of the cantilevered arm includes a protrusion adapted to be biased into a depression of one of the modules.

13. The stacking element as in claim 12, wherein the protrusion includes at least one beveled corner.

14. The stacking element as in claim 10, wherein a rib of each of a first and a second of the modules are simultaneously nestable in one of the grooves of the stacking element.

15. The system as in claim 1, wherein the stacking element comprises: a top, a bottom, and each of a front, a back and two sides extending between the top and the bottom, at least one of the top and bottom including a cutout and a cantilevered arm, at least a portion of the cantilevered arm being disposable in the cutout, each of the sides including a pair of ribs and a groove between the pair of ribs.

16. The system as in claim 15, wherein the front includes at least one beveled corner.

17. The system as in claim 15, wherein a free end of the cantilevered arm includes a protrusion.

18. The system as in claim 17, wherein the protrusion includes at least one beveled corner.

19. A telecommunications enclosure system, comprising:
   a plurality of housing modules, each of the housing modules defining an interior volume; and
   at least one stacking element positionable between a first of the housing modules and a second of the housing modules such that a first portion of the stacking element is received by the first housing module and a second portion of the stacking element is received by the second housing module,
   wherein for at least one of the housing modules, the housing module includes a lid for covering an opening to the interior volume, the lid including a plurality of walls defining an interior expansion volume, the lid being adapted to receive a portion of one of the at least one stacking element; and
   wherein when the lid is coupled to one of the housing modules, the interior volume of the one of the housing modules is expanded according to the expansion volume.

20. A telecommunications enclosure system, comprising:
a plurality of housing modules, each of the housing modules defining an interior volume; and
at least one stacking element positionable between a first of the housing modules and a second of the housing modules such that a first portion of the stacking element is received by the first housing module and a second portion of the stacking element is received by the second housing module, the stacking element including a top, a bottom, and each of a front, a back and two sides extending between the top and the bottom, at least one of the top and the bottom including a cutout and a cantilevered arm, at least a portion of the cantilevered arm being positionable in the cutout, each of the sides including a pair of ribs and a groove between the pair of ribs.

* * * * *